United States Patent
Xu et al.

(10) Patent No.: US 12,279,165 B2
(45) Date of Patent: Apr. 15, 2025

(54) METHOD AND DEVICE FOR MEASURING AND REPORTING CHANNEL STATE INFORMATION (CSI)

(71) Applicant: DATANG MOBILE COMMUNICATIONS EQUIPMENT CO., LTD., Beijing (CN)

(72) Inventors: Meng Xu, Beijing (CN); Jing Liang, Beijing (CN); Jing Fu, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 620 days.

(21) Appl. No.: 17/427,659

(22) PCT Filed: Jan. 14, 2020

(86) PCT No.: PCT/CN2020/072091
§ 371 (c)(1),
(2) Date: Aug. 2, 2021

(87) PCT Pub. No.: WO2020/156155
PCT Pub. Date: Aug. 6, 2020

(65) Prior Publication Data
US 2022/0159523 A1    May 19, 2022

(30) Foreign Application Priority Data
Feb. 1, 2019 (CN) .......................... 201910105549.X

(51) Int. Cl.
*H04W 36/00* (2009.01)
*H04W 36/24* (2009.01)
*H04W 72/044* (2023.01)
*H04W 72/23* (2023.01)

(52) U.S. Cl.
CPC ... *H04W 36/0058* (2018.08); *H04W 36/0072* (2013.01); *H04W 36/00837* (2018.08);
(Continued)

(58) Field of Classification Search
CPC ....... H04W 36/0058; H04W 36/00837; H04W 72/23; H04W 36/0072; H04W 72/044
See application file for complete search history.

(56) References Cited

U.S. PATENT DOCUMENTS

2018/0097600 A1* 4/2018 Bagheri ................ H04W 24/08
2019/0149305 A1* 5/2019 Zhou ..................... H04W 72/23
370/330

FOREIGN PATENT DOCUMENTS

CN    101998497 A    3/2011
CN    102237958 A    11/2011
(Continued)

OTHER PUBLICATIONS

3GPP TSG RAN WG1 Meeting #92bis R1-1804561 (Year: 2018).*
(Continued)

*Primary Examiner* — Ricky Q Ngo
*Assistant Examiner* — Stephen N Steiner
(74) *Attorney, Agent, or Firm* — Kilpatrick Townsend & Stockton LLP

(57) ABSTRACT

Disclosed are a method and a device for measuring and reporting channel state information (CSI). The method for measuring and reporting channel state information (CSI) includes a terminal device performing, on a specified bandwidth part (BWP) and within specified time, a CSI measurement, according to a first measurement configuration, to obtain CSI measurement results; and the terminal device reporting, on the specified BWP, the CSI measurement results to a network device, the terminal device performing a CSI measurement according to a second measurement configuration outside the specified time.

25 Claims, 5 Drawing Sheets

(52) U.S. Cl.
CPC ....... *H04W 36/249* (2023.05); *H04W 72/044* (2013.01); *H04W 72/23* (2023.01)

(56) References Cited

FOREIGN PATENT DOCUMENTS

| | | |
|---|---|---|
| CN | 102255685 A | 11/2011 |
| WO | 2018056760 A1 | 3/2018 |

OTHER PUBLICATIONS

3GPP TS 38.214 V15.4.0, 3rd Generation Partnership Project;Technical Specification Group Radio Access Network; NR;Physical layer procedures for data (Release 15), total 102 pages, Dec. 2018.

LG Electronics,"Remaining issues on bandwidth part operation", 3GPP TSG RAN WG1 Meeting #92bis, Sanya, China, Apr. 16-20, 2018, total 8 pages, R1-1804561.

Vivo,"Fallback to long CQI report", 3GPP TSG-RAN WG2 Meeting #101, Athens, Greece, Feb. 26-Mar. 2, 2018, total 1 page, R2-1802004.

Ericsson,"Fallback to long CQI reporting period", 3GPP TSG-RAN WG2 #101bis, Sanya, P.R. of China, Apr. 16-20, 2018, total 1 page, R2-1805827.

Samsung,"Discussion on allowing CSI-RS configuration over more than one BWPs", 3GPP TSG-RAN WG2 #103bis, Chengdu, China, Oct. 8-12, 2018, total 4 pages, R2-1815164(Revision of R2-1811797).

CATT,"Short CSI report for SpCell", 3GPP TSG-RAN WG2 Meeting #107, Prague, Czech Republic, Aug. 26-30, 2019, total 2 pages, R2-1908904(Resubmission R2-1905882).

* cited by examiner

METHOD AND DEVICE FOR MEASURING AND REPORTING CHANNEL STATE INFORMATION (CSI)

The present application is a national phase entry under 35. U.S.C. § 371 of International Application No. PCT/CN2020/072091, filed on Jan. 14, 2020, which claims the priority from Chinese Patent Application No. 201910105549.X, filed on Feb. 1, 2019, in the China National Intellectual Property Administration and entitled "Method and Device for Measuring and Reporting Channel State Information (CSI)", which is hereby incorporated by reference in its entirety.

FIELD

The present application relates to the field of communication technologies, and particularly to a method and device for measuring and reporting CSI.

BACKGROUND

Obtaining the Channel State Information (CSI) through channel measurement is essential for improving the transmission quality of wireless communication.

In the Long Term Evolution (LTE) system, the bandwidth of a terminal device is consistent with the system bandwidth. When performing the channel measurement, the terminal device measures and obtains the CSI on the accessed cell according to the Reference Signal (RS) transmitted by a network device, and feeds the obtained CSI back to the network device. The network device processes the transmitted signal based on the CSI and sends it to the terminal device.

In the LTE system, the bandwidth of the terminal device is consistent with the system bandwidth. However, in the NR system, a terminal device may be configured with multiple Bandwidth Parts (BWPs). When the terminal device, such as User Equipment (UE), performs the cell handover, Radio Resource Control (RRC) connection resume or RRC connection reestablishment, the network device will specify the BWPs that the UE accesses in a Primary Cell (PCell), i.e., the first active uplink BWP and the first active downlink BWP; and in the process during which the UE performs the Secondary Cell Group (SCG) addition and Primary SCG Cell (PSCell) change, the network device will specify the BWPs that the UE accesses in the PSCell, i.e., the first active uplink BWP and the first active downlink BWP. The UE's BWP switch for the active BWP may be performed by means of signaling or timer, that is, the current active BWP is switched to the target active BWP. After the UE performs the RRC connection resume, RRC connection reestablishment, SCG addition, PSCell change and BWP switch, the network device cannot perform the effective data scheduling immediately due to the lack of a CSI measurement result reported by the UE, so there is a need to wait for the UE to complete the CSI measurement and reporting, which will cause the reduced transmission rate of the air interface data.

Therefore, the fast data scheduling on PSCell, PCell and BWP switch needs to be optimized.

SUMMARY

The embodiments of the present application provide a method and device for measuring and reporting CSI to improve the utilization efficiency of wireless resources.

In a first aspect, the present application provides a method for measuring and reporting CSI, which can be executed by a terminal device. The method includes: performing, by a terminal device, a CSI measurement according to a first measurement configuration on a specified BWP and within specified time to obtain CSI measurement results; reporting, by the terminal device, the CSI measurement results to a network device on the specified BWP; where the terminal device performs a CSI measurement according to a second measurement configuration outside the specified time.

In a possible embodiment, the performing, by the terminal device, the CSI measurement according to the first measurement configuration on the specified BWP and within specified time to obtain the CSI measurement results, includes:
  performing, by the terminal device, the CSI measurement according to the first measurement configuration on the specified BWP and within the specified time to obtain the CSI measurement results when the terminal device performs a cell handover or when the terminal device completes a cell handover; and/or
  performing, by the terminal device, the CSI measurement according to the first measurement configuration on the specified BWP and within the specified time to obtain the CSI measurement results when receiving an RRC connection reestablishment message from the network device; and/or
  performing, by the terminal device, the CSI measurement according to the first measurement configuration on the specified BWP and within the specified time to obtain the CSI measurement results when receiving an RRC connection resume message from the network device; and/or
  performing, by the terminal device, the CSI measurement according to the first measurement configuration on the specified BWP and within specified time to obtain the CSI measurement results when receiving a first RRC reconfiguration message after an RRC connection reestablishment message from the network device, or when receiving a first RRC reconfiguration message after an RRC connection resume message from the network device; and/or
  performing, by the terminal device, the CSI measurement according to the first measurement configuration on the specified BWP and within the specified time to obtain the CSI measurement results when the terminal device performs SCG addition or PSCell change or when the terminal device completes SCG addition or PSCell change.

In a possible embodiment,
  the specified BWP is a first active downlink BWP specified by a PCell, or an initial downlink BWP specified by the PCell; and/or
  the specified BWP is a first active downlink BWP specified by a PSCell, or an initial downlink BWP specified by the PSCell.

In a possible embodiment, the performing, by the terminal device, the CSI measurement according to the first measurement configuration on the specified BWP and within specified time to obtain the CSI measurement results, includes:
  performing, by the terminal device, the CSI measurement according to the first measurement configuration on a target BWP and within the specified time to obtain the CSI measurement results when switching an active BWP from a source BWP to the target BWP;
  where the terminal device switches the active BWP from the source BWP to the target BWP when receiving a signaling triggering a BWP switch from the network device or when a BWP inactivity timer expires; or the terminal device switches the active BWP from the source BWP to the target BWP when receiving a signaling triggering a BWP switch from the network device.

In a possible embodiment, the terminal device performs the fast CSI measurement on the specified BWP to obtain the CSI measurement results, including:

performing, by the terminal device, the CSI measurement according to the first measurement configuration on the specified BWP and within the specified time to obtain the CSI measurement results, includes:

determining, by the terminal device, whether the specified BWP is configured with the first measurement configuration; and performing, by the terminal device, a CSI measurement according to the first measurement configuration on the specified BWP and within specified time to obtain the CSI measurement results when the specified BWP is configured with the first measurement configuration.

In a possible embodiment, the method further includes:

receiving, by the terminal device, a CSI measurement instruction from the network device, where the CSI measurement instruction carries identification information of the specified BWP, and/or the CSI measurement instruction carries the first measurement configuration, and/or the CSI measurement instruction carries indication information for instructing the terminal device to perform the CSI measurement and reporting according to the first measurement configuration within the specified time.

In a possible embodiment, the receiving, by the terminal device, the CSI measurement instruction from the network device, includes:

receiving, by the terminal device, the CSI measurement instruction from the network device through handover signaling, where the handover signaling instructs the terminal device to switch from a source primary cell to a target primary cell; and/or receiving, by the terminal device, the CSI measurement instruction from the network device through an RRC connection reestablishment message; and/or receiving, by the terminal device, the CSI measurement instruction from the network device through an RRC connection resume message; and/or receiving, by the terminal device, the CSI measurement instruction from the network device through a first RRC reconfiguration message after an RRC connection reestablishment message or through a first RRC reconfiguration message after an RRC connection resume message; and/or receiving, by the terminal device, the CSI measurement instruction from the network device through an SCG synchronous reconfiguration message, where the SCG synchronous reconfiguration message instructs the terminal device to add an SCG or instructs the terminal device to access to a target PSCell from a source PSCell; and/or receiving, by the terminal device, the CSI measurement instruction from the network device through dedicated signaling, or the CSI measurement instruction triggered by expiry of a BWP inactivity timer; where the dedicated signaling or the expiry of the BWP inactivity timer triggers the terminal device to perform BWP switch from a source BWP to a target BWP, and the dedicated signaling is RRC signaling, DCI signaling, or MAC CE signaling; and/or receiving, by the terminal device, the CSI measurement instruction from the network device through RRC signaling.

In a possible embodiment, the performing, by the terminal device, the CSI measurement according to the first measurement configuration on the specified BWP and within the specified time to obtain the CSI measurement results, includes:

activating, by the terminal device, the first measurement configuration when reaching a preset position of a subframe where the CSI measurement according to the first measurement configuration is to be started, and performing the CSI measurement and reporting according to the first measurement configuration on the specified BWP; or performing, by the terminal device, the CSI measurement and reporting according to the first measurement configuration on the specified BWP when receiving a dedicated signaling from the network device; where the dedicated signaling instructs the terminal device to activate the first measurement configuration, and perform the CSI measurement and reporting according to the first measurement configuration, and the dedicated signaling is RRC signaling, DCI signaling or MAC CE signaling.

In a possible embodiment, the method further includes:

stopping, by the terminal device, the CSI measurement and reporting according to the first measurement configuration, when reaching a preset position of a subframe where the CSI measurement according to the first measurement configuration is to be stopped, and deactivating the first measurement configuration; or stopping, by the terminal device, the CSI measurement and reporting according to the first measurement configuration, when receiving a dedicated signaling from the network device; where the dedicated signaling instructs the terminal device to deactivate the first measurement configuration, and stop the CSI measurement and reporting according to the first measurement configuration, and the dedicated signaling is RRC signaling, DCI signaling or MAC CE signaling; or starting a timer upon starting the CSI measurement according to the first measurement configuration by the terminal device, deactivating the first measurement configuration and stopping the CSI measurement and reporting according to the first measurement configuration when the timer expires; or stopping, by the terminal device, the CSI measurement and reporting according to the first measurement configuration, and deactivating the first measurement configuration upon receiving downlink scheduling on the specified BWP.

In a possible embodiment, the first measurement configuration includes at least one or more of:

configuration information of CSI measurement resources;

configuration information of CSI reporting;

effective duration, where the effective duration indicates a duration for which the terminal device is able to perform the CSI measurement and reporting according to the first measurement configuration;

configuration information of a time domain position for activating the first measurement configuration;

configuration information of a time domain position for deactivating the first measurement configuration.

In a possible embodiment, the configuration information of CSI measurement resources includes at least one or more of:

time domain configuration of CSI measurement resources;

frequency domain configuration of CSI measurement resources;

BWP identifier;

the configuration information of CSI reporting includes at least one or more of:

configuration of frequency domain resources of CSI reporting;

configuration of time domain resources of CSI reporting;

BWP identifier.

In a possible embodiment, a broadcast period of a measurement reference signal included in the first measurement configuration is less than a broadcast period of a measurement reference signal included in the second measurement configuration; and/or a CSI reporting period included in the first measurement configuration is less than a CSI reporting period included in the second measurement configuration.

In a second aspect, the present application provides a method for measuring and reporting CSI, which may be executed by a network device, such as a base station. The method includes:

receiving, by a network device, CSI measurement results reported by a terminal device through a specified BWP, where the CSI measurement results are obtained by the terminal device performing a CSI measurement according to a first measurement configuration on the specified BWP and within specified time;

scheduling, by the network device, the terminal device on the specified BWP according to the CSI measurement results;

and the network device receives measurement results reported by the terminal device and obtained by performing a CSI measurement according to a second measurement configuration outside the specified time.

In a possible embodiment, the receiving, by the network device, the CSI measurement results reported by the terminal device through the specified BWP, includes:

receiving, by the network device, the CSI measurement results reported by the terminal device through the specified BWP, when the terminal device performs a cell handover or when the terminal device completes a cell handover; and/or receiving, by the network device, the CSI measurement results reported by the terminal device through the specified BWP, after the terminal device receives an RRC connection reestablishment message from the network device; and/or receiving, by the network device, the CSI measurement results reported by the terminal device through the specified BWP, after the terminal device receives an RRC connection resume message from the network device; and/or receiving, by the network device, the CSI measurement results reported by the terminal device through the specified BWP, after the terminal device receives a first RRC reconfiguration message after an RRC connection reestablishment message from the network device, or after the terminal device receives a first RRC reconfiguration message after an RRC connection resume message from the network device; and/or receiving, by the network device, the CSI measurement results reported by the terminal device through the specified BWP, when the terminal device performs SCG addition or PSCell change, or when the terminal device completes SCG addition or PSCell change.

In a possible embodiment, the specified BWP is a first active downlink BWP specified by a PCell, or an initial downlink BWP specified by the PCell; and/or the specified BWP is a first active downlink BWP specified by a PSCell, or an initial downlink BWP specified by the PSCell.

In a possible embodiment, the receiving, by the network device, the CSI measurement results reported by the terminal device through the specified BWP, includes:

receiving, by the network device, the CSI measurement results reported by the terminal device through a target BWP, when the terminal device switches an active BWP from a source BWP to the target BWP;

where the network device sends a signaling triggering a BWP switch to the terminal device to trigger the terminal device to switch the active BWP from the source BWP to the target BWP, or the network device configures a BWP inactivity timer for the terminal device, to trigger the terminal device to switch the active BWP from the source BWP to the target BWP when the timer expires; or the network device sends a signaling triggering a BWP switch to the terminal device, to trigger the terminal device to switch the active BWP from the source BWP to the target BWP.

In a possible embodiment, the method further includes:

sending, by the network device, a CSI measurement instruction to the terminal device; where the CSI measurement instruction carries identification information of the specified BWP, and/or the CSI measurement instruction carries the first measurement configuration, and/or the CSI measurement instruction carries indication information for instructing the terminal device to perform the CSI measurement and reporting according to the first measurement configuration within the specified time.

In a possible embodiment, the sending, by the network device, the CSI measurement instruction to the terminal device, includes:

sending, by the network device, the CSI measurement instruction to the terminal device through handover signaling; where the handover signaling instructs the terminal device to switch from a source primary cell to a target primary cell; and/or sending, by the network device, the CSI measurement instruction to the terminal device through an RRC connection reestablishment message; and/or sending, by the network device, the CSI measurement instruction to the terminal device through an RRC connection resume message; and/or sending, by the network device, the CSI measurement instruction to the terminal device through a first RRC reconfiguration message after sending an RRC connection reestablishment message, or through a first RRC reconfiguration message after sending an RRC connection resume message; and/or sending, by the network device, the CSI measurement instruction to the terminal device through an SCG synchronous reconfiguration message; where the SCG synchronous reconfiguration message instructs the terminal device to add an SCG or instructs the terminal device to switch from a source PSCell to a target PSCell; and/or sending, by the network device, the CSI measurement instruction to the terminal device through dedicated signaling, or configuring, by the network device, a BWP inactivity timer for the terminal device to trigger the CSI measurement instruction of the terminal device when the BWP inactivity timer expires; where the dedicated signaling or the expiry of the BWP inactivity timer triggers the terminal device to switch an active BWP from a source BWP to a target BWP, and the dedicated signaling is RRC signaling, DCI signaling, or MAC CE signaling; and/or sending, by the network device, the CSI measurement instruction to the terminal device through RRC signaling.

In a possible embodiment, the method further includes:
sending, by the network device, a dedicated signaling to the terminal device so that the terminal device performs the CSI measurement and reporting according to the first measurement configuration on the specified BWP; where the dedicated signaling instructs the terminal device to activate the first measurement configuration and perform the CSI measurement and reporting according to the first measurement configuration, and the dedicated signaling is RRC signaling, DCI signaling or MAC CE signaling.

In a possible embodiment, the method further includes:
sending, by the network device, a dedicated signaling to the terminal device so that the terminal device stops the CSI measurement and reporting according to the first measurement configuration; where the dedicated signaling instructs the terminal device to deactivate the first measurement configuration and stop the CSI measurement and reporting according to the first measurement configuration, and the dedicated signaling is RRC signaling, DCI signaling or MAC CE signaling.

In a possible embodiment, the first measurement configuration includes at least one or more of:
configuration information of CSI measurement resources;
configuration information of CSI reporting;
effective duration, where the effective duration indicates a duration for which the terminal device is able to perform the CSI measurement and reporting according to the first measurement configuration;
configuration information of a time domain position for activating the first measurement configuration;
configuration information of a time domain position for deactivating the first measurement configuration.

In a possible embodiment, the configuration information of CSI measurement resources includes at least one or more of:
time domain configuration of CSI measurement resources;
frequency domain configuration of CSI measurement resources;
BWP identifier;
the configuration information of CSI reporting includes at least one or more of:
configuration of frequency domain resources of CSI reporting;
configuration of time domain resources of CSI reporting;
BWP identifier.

In a possible embodiment,
a broadcast period of a measurement reference signal included in the first measurement configuration is less than a broadcast period of a measurement reference signal included in the second measurement configuration; and/or
a CSI reporting period included in the first measurement configuration is less than a CSI reporting period included in the second measurement configuration.

In a third aspect, the present application provides a terminal device, including:
a memory configured to store instructions;
a processor configured to read the instructions in the memory to perform the process of:
performing a CSI measurement according to a first measurement configuration on a specified BWP and within specified time to obtain CSI measurement results;
a transmitter configured to report the CSI measurement results to a network device on the specified BWP under control of the processor;
where the terminal device performs a CSI measurement according to a second measurement configuration outside the specified time.

In one possible embodiment, the processor is configured to:
perform the CSI measurement according to the first measurement configuration on the specified BWP and within the specified time to obtain the CSI measurement results when the terminal device performs a cell handover or when the terminal device completes a cell handover; and/or
perform the CSI measurement according to the first measurement configuration on the specified BWP and within the specified time to obtain the CSI measurement results when receiving an RRC connection reestablishment message from the network device; and/or
perform the CSI measurement according to the first measurement configuration on the specified BWP and within the specified time to obtain the CSI measurement results when receiving an RRC connection resume message from the network device; and/or
perform the CSI measurement according to the first measurement configuration on the specified BWP and within the specified time to obtain the CSI measurement results when receiving a first RRC reconfiguration message after an RRC connection reestablishment message from the network device, or when receiving a first RRC reconfiguration message after an RRC connection resume message from the network device; and/or
perform the CSI measurement according to the first measurement configuration on the specified BWP and within the specified time to obtain the CSI measurement results when the terminal device performs SCG addition or PSCell change or when the terminal device completes SCG addition or PSCell change.

In a possible embodiment,
the specified BWP is a first active downlink BWP specified by a PCell or an initial downlink BWP specified by the PCell; and/or
the specified BWP is a first active downlink BWP specified by a PSCell or an initial downlink BWP specified by the PSCell.

In one possible embodiment, the processor is configured to:
perform the CSI measurement according to the first measurement configuration on a target BWP and within the specified time to obtain the CSI measurement results when switching an active BWP from a source BWP to the target BWP;
where the terminal device switches the active BWP from the source BWP to the target BWP when receiving a signaling triggering a BWP switch from the network device or when a BWP inactivity timer expires; or the terminal device switches the active BWP from the source BWP to the target BWP when receiving a signaling triggering a BWP switch from the network device.

In one possible embodiment, the processor is configured to:
  determine whether the specified BWP is configured with the first measurement configuration; and
  perform the CSI measurement according to the first measurement configuration on the specified BWP and within the specified time to obtain the CSI measurement results when the specified BWP is configured with the first measurement configuration.

In a possible embodiment, the terminal device further includes:
  a receiver configured to receive a CSI measurement instruction from the network device; where the CSI measurement instruction carries identification information of the specified BWP, and/or the CSI measurement instruction carries the first measurement configuration, and/or the CSI measurement instruction carries indication information for instructing the terminal device to perform the CSI measurement and reporting according to the first measurement configuration within the specified time.

In a possible embodiment, the receiver is configured to:
  receive the CSI measurement instruction from the network device through handover signaling, where the handover signaling instructs the terminal device to switch from a source primary cell to a target primary cell; and/or
  receive the CSI measurement instruction from the network device through an RRC connection reestablishment message; and/or
  receive the CSI measurement instruction from the network device through an RRC connection resume message; and/or
  receive the CSI measurement instruction from the network device through a first RRC reconfiguration message after receiving an RRC connection reestablishment message or through a first RRC reconfiguration message after receiving an RRC connection resume message; and/or
  receive the CSI measurement instruction from the network device through an SCG synchronous reconfiguration message, where the SCG synchronous reconfiguration message instructs the terminal device to add an SCG or instructs the terminal device to access to a target PSCell from a source PSCell; and/or
  receive the CSI measurement instruction from the network device through dedicated signaling, or the CSI measurement instruction triggered by expiry of a BWP inactivity timer, where the dedicated signaling or the expiry of the BWP inactivity timer triggers the terminal device to perform BWP switch from a source BWP to a target BWP, and the dedicated signaling is RRC signaling, DCI signaling, or MAC CE signaling; and/or
  receive the CSI measurement instruction from the network device through RRC signaling.

In one possible embodiment, the processor is configured to:
  activate the first measurement configuration when reaching a preset position of a subframe where the CSI measurement according to the first measurement configuration is to be started, and perform the CSI measurement and reporting according to the first measurement configuration on the specified BWP; or
  perform the CSI measurement and reporting according to the first measurement configuration on the specified BWP and within the specified time when receiving a dedicated signaling from the network device, where the dedicated signaling instructs the terminal device to activate the first measurement configuration and perform the CSI measurement and reporting according to the first measurement configuration, and the dedicated signaling is RRC signaling, DCI signaling or MAC CE signaling.

In a possible embodiment, the processor is further configured to:
  stop the CSI measurement and reporting according to the first measurement configuration when reaching a preset position of a subframe where the CSI measurement according to the first measurement configuration is to be stopped, and deactivate the first measurement configuration; or
  stop the CSI measurement and reporting according to the first measurement configuration when receiving a dedicated signaling from the network device, where the dedicated signaling instructs the terminal device to deactivate the first measurement configuration and stop the CSI measurement and reporting according to the first measurement configuration, and the dedicated signaling is RRC signaling, DCI signaling or MAC CE signaling; or
  start a timer upon starting the CSI measurement according to the first measurement configuration by the terminal device, deactivate the first measurement configuration, and stop the CSI measurement and reporting according to the first measurement configuration when the timer expires; or
  stop the CSI measurement and reporting according to the first measurement configuration, and deactivate the first measurement configuration upon receiving downlink scheduling on the specified BWP.

In a possible embodiment, the first measurement configuration includes at least one or more of:
  configuration information of CSI measurement resources;
  configuration information of CSI reporting;
  effective duration, where the effective duration indicates a duration for which the terminal device is able to perform the CSI measurement and reporting according to the first measurement configuration;
  configuration information of a time domain position for activating the first measurement configuration;
  configuration information of a time domain position for deactivating the first measurement configuration.

In a possible embodiment, the configuration information of CSI measurement resources includes at least one or more of:
  time domain configuration of CSI measurement resources;
  frequency domain configuration of CSI measurement resources;
  BWP identifier;
  the configuration information of CSI reporting includes at least one or more of:
  configuration of frequency domain resources of CSI reporting;
  configuration of time domain resources of CSI reporting;
  BWP identifier.

In a possible embodiment,
  a broadcast period of a measurement reference signal included in the first measurement configuration is less than a broadcast period of a measurement reference signal included in the second measurement configuration; and/or a CSI reporting period included in the first measurement configuration is less than a CSI reporting period included in the second measurement configuration.

In a fourth aspect, the present application provides a network device, including:

a memory configured to store instructions;

a receiver configured to receive CSI measurement results reported by a terminal device through a specified BWP under control of a processor, where the CSI measurement results are obtained by the terminal device performing a CSI measurement according to the first measurement configuration on the specified BWP and within specified time;

a processor configured to read the instructions stored in the memory to perform the process of:

scheduling the terminal device on the specified BWP according to the CSI measurement results;

wherein the network device receives measurement results reported by the terminal device and obtained by performing a CSI measurement according to a second measurement configuration outside the specified time.

In a possible embodiment, the receiver is configured to:

receive the CSI measurement results reported by the terminal device through the specified BWP when the terminal device performs a cell handover or when the terminal device completes a cell handover; and/or receive the CSI measurement results reported by the terminal device through the specified BWP after the terminal device receives an RRC connection reestablishment message from the network device; and/or receive the CSI measurement results reported by the terminal device through the specified BWP after the terminal device receives an RRC connection resume message from the network device; and/or receive the CSI measurement results reported by the terminal device through the specified BWP after the terminal device receives a first RRC reconfiguration message after an RRC connection reestablishment message from the network device, or after the terminal device receives a first RRC reconfiguration message after an RRC connection resume message from the network device; and/or receive the CSI measurement results reported by the terminal device through the specified BWP when the terminal device performs SCG addition or PSCell change or when the terminal device completes SCG addition or PSCell change.

In a possible embodiment, the specified BWP is a first active downlink BWP specified by a PCell or an initial downlink BWP specified by the PCell; and/or the specified BWP is a first active downlink BWP specified by a PSCell or an initial downlink BWP specified by the PSCell.

In a possible embodiment, the receiver is configured to:

receive the CSI measurement results reported by the terminal device through a target BWP when the terminal device switches an active BWP from a source BWP to the target BWP;

where the network device sends a signaling triggering a BWP switch to the terminal device to trigger the terminal device to switch the active BWP from the source BWP to the target BWP, or the network device configures a BWP inactivity timer for the terminal device, to trigger the terminal device to switch the active BWP from the source BWP to the target BWP when the timer expires; or the network device sends a signaling triggering a BWP switch to the terminal device, to trigger the terminal device to switch the active BWP from the source BWP to the target BWP.

In a possible embodiment, the network device further includes:

a transmitter configured to send a CSI measurement instruction to the terminal device; where the CSI measurement instruction carries identification information of the specified BWP, and/or the CSI measurement instruction carries the first measurement configuration, and/or the CSI measurement instruction carries indication information for instructing the terminal device to perform the CSI measurement and reporting according to the first measurement configuration within the specified time.

In a possible embodiment, the transmitter is configured to:

send the CSI measurement instruction to the terminal device through handover signaling; where the handover signaling instructs the terminal device to switch from a source primary cell to a target primary cell; and/or send the CSI measurement instruction to the terminal device through an RRC connection reestablishment message; and/or send the CSI measurement instruction to the terminal device through an RRC connection resume message; and/or send the CSI measurement instruction to the terminal device through a first RRC reconfiguration message after sending an RRC connection reestablishment message or through a first RRC reconfiguration message after sending an RRC connection resume message; and/or send the CSI measurement instruction to the terminal device through an SCG synchronous reconfiguration message, where the SCG synchronous reconfiguration message instructs the terminal device to add an SCG or instructs the terminal device to switch from a source PSCell to a target PSCell; and/or send the CSI measurement instruction to the terminal device through dedicated signaling, or configure a BWP inactivity timer for the terminal device to trigger the CSI measurement instruction of the terminal device when the BWP inactivity timer expires, where the dedicated signaling or the expiry of the BWP inactivity timer triggers the terminal device to switch an active BWP from a source BWP to a target BWP, and the dedicated signaling is RRC signaling, DCI signaling, or MAC CE signaling; and/or send the CSI measurement instruction to the terminal device through RRC signaling.

In a possible embodiment, the transmitter is further configured to:

send a dedicated signaling to the terminal device so that the terminal device performs the CSI measurement and reporting according to the first measurement configuration on the specified BWP, where the dedicated signaling instructs the terminal device to activate the first measurement configuration and perform the CSI measurement and reporting according to the first measurement configuration, and the dedicated signaling is RRC signaling, DCI signaling or MAC CE signaling.

In a possible embodiment, the transmitter is further configured to:

send a dedicated signaling to the terminal device so that the terminal device stops the CSI measurement and reporting according to the first measurement configuration, where the dedicated signaling instructs the terminal device to deactivate the first measurement configuration and stop the CSI measurement and reporting according to the first measurement configuration, and the dedicated signaling is RRC signaling, DCI signaling or MAC CE signaling.

In a possible embodiment, the first measurement configuration includes at least one or more of:
  configuration information of CSI measurement resources;
  configuration information of CSI reporting;
  effective duration, where the effective duration indicates a duration for which the terminal device is able to perform the CSI measurement and reporting according to the first measurement configuration;
  configuration information of a time domain position for activating the first measurement configuration;
  configuration information of a time domain position for deactivating the first measurement configuration.

In a possible embodiment, the configuration information of CSI measurement resources includes at least one or more of:
  time domain configuration of CSI measurement resources;
  frequency domain configuration of CSI measurement resources;
  BWP identifier;
  the configuration information of CSI reporting includes at least one or more of:
  configuration of frequency domain resources of CSI reporting;
  configuration of time domain resources of CSI reporting;
  BWP identifier.

In a possible embodiment,
  a broadcast period of a measurement reference signal included in the first measurement configuration is less than a broadcast period of a measurement reference signal included in the second measurement configuration; and/or
  a CSI reporting period included in the first measurement configuration is less than a CSI reporting period included in the second measurement configuration.

In a fifth aspect, the present application provides a terminal device, including:
  a measurement device configured to perform a CSI measurement according to a first measurement configuration on a specified BWP and within specified time to obtain CSI measurement results; and
  a reporting device configured to report the CSI measurement results to a network device on the specified BWP;
  where the terminal device performs a CSI measurement according to a second measurement configuration outside the specified time.

In a possible embodiment, when performing the CSI measurement according to the first measurement configuration on the specified BWP and within the specified time to obtain the CSI measurement results, the measurement device is further configured to:
  perform the CSI measurement according to the first measurement configuration on the specified BWP and within the specified time to obtain the CSI measurement results when the terminal device performs a cell handover or when the terminal device completes a cell handover; and/or
  perform the CSI measurement according to the first measurement configuration on the specified BWP and within the specified time to obtain the CSI measurement results when receiving an RRC connection reestablishment message from the network device; and/or
  perform the CSI measurement according to the first measurement configuration on the specified BWP and within the specified time to obtain the CSI measurement results when receiving an RRC connection resume message from the network device; and/or
  perform the CSI measurement according to the first measurement configuration on the specified BWP and within the specified time to obtain the CSI measurement results when receiving a first RRC reconfiguration message after an RRC connection reestablishment message from the network device or when receiving a first RRC reconfiguration message after an RRC connection resume message from the network device; and/or
  perform the CSI measurement according to the first measurement configuration on the specified BWP and within the specified time to obtain the CSI measurement results when the terminal device performs SCG addition or PSCell change or when the terminal device completes SCG addition or PSCell change.

In a possible embodiment,
  the specified BWP is a first active downlink BWP specified by a PCell, or an initial downlink BWP specified by the PCell; and/or
  the specified BWP is a first active downlink BWP specified by a PSCell, or an initial downlink BWP specified by the PSCell.

In a possible embodiment, when performing the CSI measurement according to the first measurement configuration on the specified BWP and within the specified time to obtain the CSI measurement results, the measurement device is further configured to:
  perform the CSI measurement according to the first measurement configuration on a target BWP and within the specified time to obtain the CSI measurement results when switching an active BWP from a source BWP to the target BWP;
  where the terminal device switches the active BWP from the source BWP to the target BWP when receiving a signaling triggering a BWP switch from the network device or when a BWP inactivity timer expires; or the terminal device switches the active BWP from the source BWP to the target BWP when receiving a signaling triggering a BWP switch from the network device.

In a possible embodiment, when performing the CSI measurement according to the first measurement configuration on the specified BWP and within the specified time to obtain the CSI measurement results, the measurement device is further configured to:
  determine whether the specified BWP is configured with the first measurement configuration; and
  perform the CSI measurement according to the first measurement configuration on the specified BWP and within the specified time to obtain the CSI measurement results when the specified BWP is configured with the first measurement configuration.

In a possible embodiment, the terminal device further includes:
  a receiving device configured to receive a CSI measurement instruction from the network device, where the CSI measurement instruction carries identification information of the specified BWP, and/or the CSI measurement instruction carries the first measurement configuration, and/or the CSI measurement instruction carries indication information for instructing the terminal device to perform the CSI measurement and reporting according to the first measurement configuration within the specified time.

In a possible embodiment, when receiving the CSI measurement instruction from the network device, the receiving device is further configured to:

receive the CSI measurement instruction from the network device through handover signaling, where the handover signaling instructs the terminal device to switch from a source primary cell to a target primary cell; and/or receive the CSI measurement instruction from the network device through an RRC connection reestablishment message; and/or receive the CSI measurement instruction from the network device through an RRC connection resume message; and/or receive the CSI measurement instruction from the network device through a first RRC reconfiguration message after receiving an RRC connection reestablishment message or through a first RRC reconfiguration message after receiving an RRC connection resume message; and/or receive the CSI measurement instruction from the network device through an SCG synchronous reconfiguration message, where the SCG synchronous reconfiguration message instructs the terminal device to add an SCG or instructs the terminal device to access to a target PSCell from a source PSCell; and/or receive the CSI measurement instruction from the network device through dedicated signaling or the CSI measurement instruction triggered by expiry of a BWP inactivity timer, where the dedicated signaling or the expiry of the BWP inactivity timer triggers the terminal device to perform BWP switch from a source BWP to a target BWP, and the dedicated signaling is RRC signaling, DCI signaling, or MAC CE signaling; and/or receive the CSI measurement instruction from the network device through RRC signaling.

In a possible embodiment, when performing the CSI measurement according to the first measurement configuration on the specified BWP to obtain the CSI measurement results, the measurement device is further configured to:

activate the first measurement configuration when reaching a preset position of a subframe where the CSI measurement according to the first measurement configuration is to be started, and perform the measurement and reporting according to the first measurement configuration on the specified BWP; or perform the CSI measurement and reporting according to the first measurement configuration on the specified BWP when receiving a dedicated signaling from the network device, where the dedicated signaling instructs the terminal device to activate the first measurement configuration and perform the CSI measurement and reporting according to the first measurement configuration, and the dedicated signaling is RRC signaling, DCI signaling or MAC CE signaling.

In a possible embodiment, the measurement device is further configured to:

stop the CSI measurement and reporting according to the first measurement configuration, when reaching a preset position of a subframe where the CSI measurement according to the first measurement configuration is to be stopped, and deactivate the first measurement configuration; or stop the CSI measurement and reporting according to the first measurement configuration when receiving a dedicated signaling from the network device, where the dedicated signaling instructs the terminal device to deactivate the first measurement configuration and stop the CSI measurement and reporting according to the first measurement configuration, and the dedicated signaling is RRC signaling, DCI signaling or MAC CE signaling; or start a timer upon starting the CSI measurement according to the first measurement configuration by the terminal device, and deactivate the first measurement configuration and stop the CSI measurement and reporting according to the first measurement configuration when the timer expires; or stop the CSI measurement and reporting according to the first measurement configuration and deactivate the first measurement configuration upon receiving downlink scheduling on the specified BWP.

In a possible embodiment, the first measurement configuration includes at least one or more of:

configuration information of CSI measurement resources;

configuration information of CSI reporting;

effective duration, where the effective duration indicates a duration for which the terminal device is able to perform the CSI measurement and reporting according to the first measurement configuration;

configuration information of a time domain position for activating the first measurement configuration;

configuration information of a time domain position for deactivating the first measurement configuration.

In a possible embodiment, the configuration information of CSI measurement resources includes at least one or more of:

time domain configuration of CSI measurement resources;

frequency domain configuration of CSI measurement resources;

BWP identifier;

the configuration information of CSI reporting includes at least one or more of:

configuration of frequency domain resources of CSI reporting;

configuration of time domain resources of CSI reporting;

BWP identifier.

In a possible embodiment, a broadcast period of a measurement reference signal included in the first measurement configuration is less than a broadcast period of a measurement reference signal included in the second measurement configuration; and/or a CSI reporting period included in the first measurement configuration is less than a CSI reporting period included in the second measurement configuration.

In a sixth aspect, the present application provides a network device, including:

a receiving device configured to receive CSI measurement results reported by a terminal device through a specified BWP, where the CSI measurement results are obtained by the terminal device performing a CSI measurement according to the first measurement configuration on the specified BWP and within specified time;

a scheduling device configured to schedule the terminal device on the specified BWP according to the CSI measurement results;

where the network device receives CSI measurement results reported by the terminal device and obtained by performing a CSI measurement according to a second measurement configuration outside the specified time.

In a possible embodiment, when receiving the CSI measurement results reported by the terminal device through the specified BWP, the receiving device is further configured to:

receive the CSI measurement results reported by the terminal device through the specified BWP when the terminal device performs a cell handover or when the terminal device completes a cell handover; and/or receive the CSI measurement results reported by the terminal device through the specified BWP after the terminal device receives an RRC connection reestablishment message from the network device; and/or receive the CSI measurement results reported by the terminal device through the specified BWP after the terminal device receives an RRC connection resume message from the network device; and/or receive the CSI measurement results reported by the terminal device through the specified BWP after the terminal device receives a first RRC reconfiguration message after an RRC connection reestablishment message from the network device or after the terminal device receives a first RRC reconfiguration message after an RRC connection resume message from the network device; and/or receive the CSI measurement results reported by the terminal device through the specified BWP when the terminal device performs SCG addition or PSCell change or when the terminal device completes SCG addition or PSCell change.

In a possible embodiment, the specified BWP is a first active downlink BWP specified by a PCell or an initial downlink BWP specified by the PCell; and/or the specified BWP is a first active downlink BWP specified by a PSCell or an initial downlink BWP specified by the PSCell.

In a possible embodiment, when receiving the CSI measurement results reported by the terminal device through the specified BWP, the receiving device is further configured to:

receive the CSI measurement results reported by the terminal device through a target BWP when the terminal device switches an active BWP from a source BWP to the target BWP;

where the network device sends a signaling triggering a BWP switch to the terminal device to trigger the terminal device to switch the active BWP from the source BWP to the target BWP, or the network device configures a BWP inactivity timer for the terminal device, to trigger the terminal device to switch the active BWP from the source BWP to the target BWP when the BWP inactivity timer expires; or the network device sends a signaling triggering a BWP switch to the terminal device, to trigger the terminal device to switch the active BWP from the source BWP to the target BWP.

In a possible embodiment, the network device further includes:

a sending device configured to send a CSI measurement instruction to the terminal device; where the CSI measurement instruction carries identification information of the specified BWP, and/or the CSI measurement instruction carries the first measurement configuration, and/or the CSI measurement instruction carries indication information for instructing the terminal device to perform the CSI measurement and reporting according to the first measurement configuration within the specified time.

In a possible embodiment, when sending the CSI measurement instruction to the terminal device, the sending device is further configured to:

send the CSI measurement instruction to the terminal device through handover signaling, where the handover signaling instructs the terminal device to switch from a source primary cell to a target primary cell; and/or send the CSI measurement instruction to the terminal device through an RRC connection reestablishment message; and/or send the CSI measurement instruction to the terminal device through an RRC connection resume message; and/or send the CSI measurement instruction to the terminal device through a first RRC reconfiguration message after sending an RRC connection reestablishment message or through a first RRC reconfiguration message after sending an RRC connection resume message; and/or send the CSI measurement instruction to the terminal device through an SCG synchronous reconfiguration message, where the SCG synchronous reconfiguration message instructs the terminal device to add an SCG or instructs the terminal device to switch from a source PSCell to a target PSCell; and/or send the CSI measurement instruction to the terminal device through dedicated signaling, or configure a BWP inactivity timer for the terminal device to trigger the CSI measurement instruction of the terminal device when the BWP inactivity timer expires, where the dedicated signaling or the expiry of the BWP inactivity timer triggers the terminal device to switch an active BWP from a source BWP to a target BWP, and the dedicated signaling is RRC signaling, DCI signaling, or MAC CE signaling; and/or send the CSI measurement instruction to the terminal device through RRC signaling.

In a possible embodiment, the sending device is further configured to:

send a dedicated signaling to the terminal device so that the terminal device performs the CSI measurement and reporting according to the first measurement configuration on the specified BWP; where the dedicated signaling instructs the terminal device to activate the first measurement configuration and perform the CSI measurement and reporting according to the first measurement configuration, and the dedicated signaling is RRC signaling, DCI signaling or MAC CE signaling.

In a possible embodiment, the sending device is further configured to:

send a dedicated signaling to the terminal device so that the terminal device stops the CSI measurement and reporting according to the first measurement configuration; where the dedicated signaling instructs the terminal device to deactivate the first measurement configuration and stop the CSI measurement and reporting according to the first measurement configuration, and the dedicated signaling is RRC signaling, DCI signaling or MAC CE signaling.

In a possible embodiment, the first measurement configuration includes at least one or more of:

configuration information of CSI measurement resources;
configuration information of CSI reporting;
effective duration, where the effective duration indicates a duration for which the terminal device is able to perform the CSI measurement and reporting according to the first measurement configuration;
configuration information of a time domain position for activating the first measurement configuration;
configuration information of a time domain position for deactivating the first measurement configuration.

In a possible embodiment, the configuration information of CSI measurement resources includes at least one or more of:
time domain configuration of CSI measurement resources;
frequency domain configuration of CSI measurement resources;
BWP identifier;
the configuration information of CSI reporting includes at least one or more of:
configuration of frequency domain resources of CSI reporting;
configuration of time domain resources of CSI reporting;
BWP identifier;

In a possible embodiment,
a broadcast period of a measurement reference signal included in the first measurement configuration is less than a broadcast period of a measurement reference signal included in the second measurement configuration; and/or
a CSI reporting period included in the first measurement configuration is less than a CSI reporting period included in the second measurement configuration.

In a seventh aspect, the present application provides a computer storage medium, which stores the computer software instructions used to execute the functions of the first aspect and any embodiment of the first aspect, or the functions of the second aspect and any embodiment of the second aspect; or includes the programs involved when performing the method of the first aspect or any embodiment of the first aspect, or the method of the second aspect or any embodiment of the second aspect.

In an eighth aspect, the present application provides a computer program product that, when invoked and executed by a computer, can cause the computer to perform the method of the first aspect or any embodiment of the first aspect, or the method of the second aspect or any embodiment of the second aspect.

BRIEF DESCRIPTION OF THE DRAWINGS

In order to illustrate the embodiments of the disclosure more clearly, the accompanying figures which need to be used in the embodiments of the disclosure will be introduced below briefly.

DETAILED DESCRIPTION OF THE EMBODIMENTS

Figure 1:
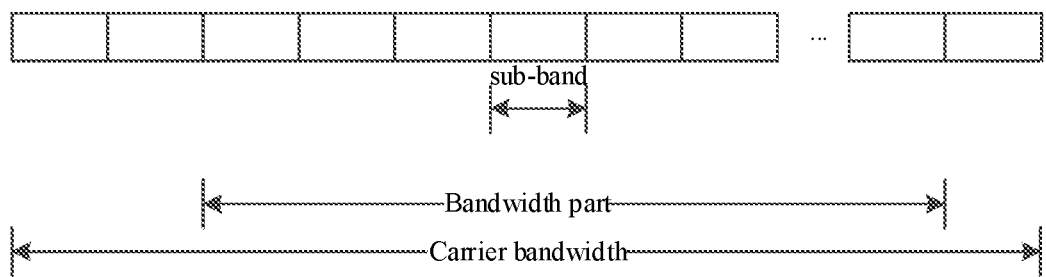
FIG. 1 is a schematic diagram of frequency band division provided by an embodiment of the present application.

The embodiments of the disclosure will be described clearly and completely below in combination with the accompanying drawings in the embodiments of the disclosure. The described embodiments are a part of the embodiments of the disclosure but not all the embodiments.

The embodiments of the disclosure will be described clearly and completely below in combination with the accompanying drawings in the embodiments of the disclosure.

The embodiments described herein may be applicable to the fifth-generation mobile communication technology (5G) system, and may also be used in the next-generation mobile communication system as well as the LTE system.

(1) Network device, for example, including base station (for example, access point), which may refer to a device that communicates with a wireless terminal device through one or more cells on an air interface in the access network. The base station may be used to perform the inter-conversion between the received air frame and the IP packet, and used as the router between the terminal device and the rest of the access network. The rest of the access network may include an IP network. The base station may further coordinate the attribute management of the air interface. For example, the base station may include the evolutional Node B (NodeB or eNB or e-NodeB) in the LTE system or LTE-Advanced (LTE-A) system, or may include the next generation node B (gNB) in the 5G system, which is not limited in the embodiments of the present application.

(2) Terminal device, including a device for providing the voice and/or data connectivity to users, for example, which may include a handheld device with the wireless connection function, or a processing device connected to a wireless modem. The terminal device may communicate with the core network via the Radio Access Network (RAN), and exchange the voice and/or data with the RAN. The terminal device may include User Equipment (UE), wireless terminal device, mobile terminal device, subscriber device, subscriber station, mobile station, mobile, remote station, Access Point (AP), remote terminal, access terminal, user terminal, user agent, or user device, etc. For example, it may include a mobile phone (or called "cellular" phone); a computer with a mobile terminal device; a portable, pocket, handheld, computer built-in or vehicle-carried mobile device; a smart wearable device or the like, e.g., Personal Communication Service (PCS) telephone, cordless telephone, Session Initiation Protocol (SIP) telephone, Wireless Local Loop (WLL) station, Personal Digital Assistant (PDA), smart watch, smart helmet, smart glasses, smart bracelet, and other devices. It also includes limited devices, e.g., device with lower power consumption, device with limited storage capability, or device with limited computing capability or the like, e.g., includes the bar code, Radio Frequency Identification (RFID) sensor, Global Positioning System (GPS), laser scanner and other information sensing devices.

(3) The Dual Connectivity (DC) function is introduced into the LTE system, and the DC includes two cell groups:

Master Cell Group (MCG) and SCG. The MCG includes a PCell and may also include at least one Secondary Cell (SCell), and the SCG includes a PSCell and may also include at least one SCell. The base station that manages the MCG is called Master Node (MN), and the base station that manages the SCG is called Secondary Node (SN).

(4) BWP: in the New Radio (NR) system, as shown in FIG. 1, the Carrier Bandwith can be regarded as a kind of broadband and can include at least one BWP. The network device configures at least one BWP for the terminal device, and activates a part of the configured BWPs for the terminal device to perform uplink and downlink transmission, in this case, the activated downlink BWP is called active DL BWP, and the activated uplink BWP is called active UL BWP. In the R15 version, for the terminal device, only one downlink BWP (DL BWP) and one uplink BWP (UL BWP) can be activated at one moment, and the BWPs in the inactive state cannot perform the uplink and downlink signaling and data transmission. Here, BWPs are mainly divided into two categories, i.e., Initial BWP and Dedicated BWP. The Initial BWP is mainly used by a terminal device to receive the system information and initiate a random access, etc., while the Dedicated BWP is mainly used for data service transmission. The bandwidth of the Dedicated BWP can be configured to be greater than the bandwidth of the Initial BWP.

(5) The terms "system" and "network" in the embodiments of the present application can be used interchangeably. "Multiple" refers to two or more than two. In view of this, "multiple" may also be understood as "at least two" in the embodiments of the present application. "And/or" describes the association relationship of the associated objects, and indicates that there may be three relationships, for example, A and/or B may represent: only A, both A and B, and only B. Furthermore, the character "I" generally indicates that the associated objects have a kind of "or" relationship, unless otherwise specified.

Figure 2:
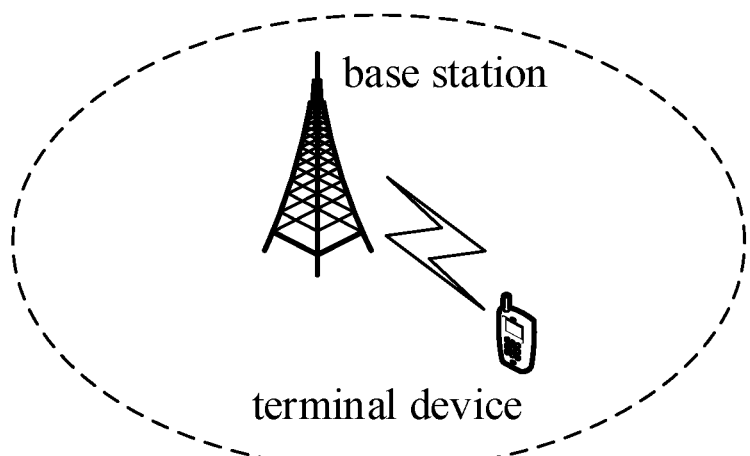
FIG. 2 is a schematic diagram of an application scenario provided by an embodiment of the present application.

Referring to FIG. 2, it is an application scenario of an embodiment of the present application. FIG. 2 includes a base station and a terminal device located within the coverage of the base station, and the data is transmitted between the base station and the terminal device through a channel.

The embodiments of the present application will be introduced with reference to the accompanying drawings. In the following introduction, the embodiments provided by the present application is applied in the application scenario shown in FIG. 2 as an example, and with the network device as a base station.

Figure 3:
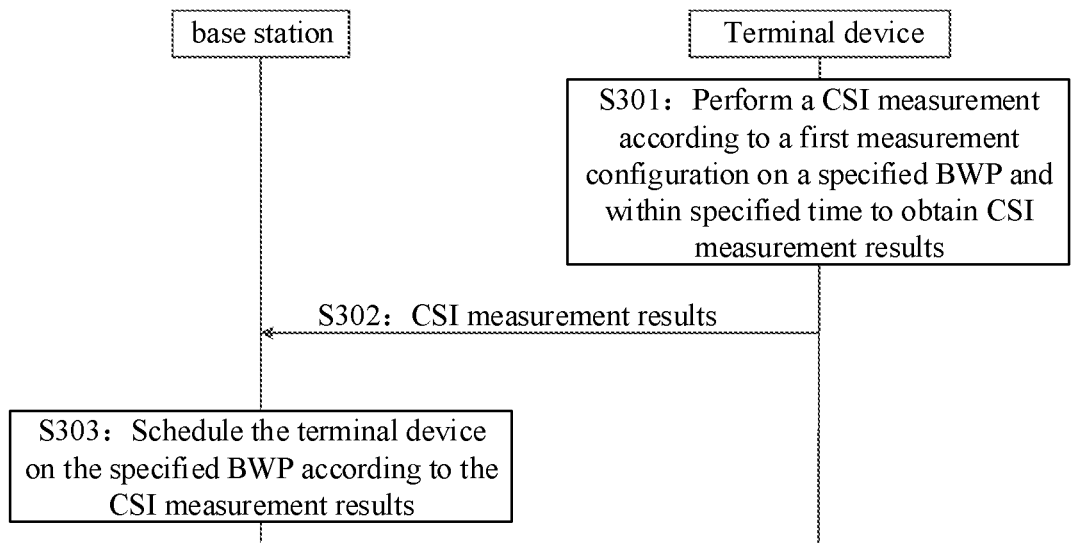
FIG. 3 is a flowchart of CSI measurement and reporting provided by an embodiment of the present application.

Referring to FIG. 3, an embodiment of the present application provides a method for measuring and reporting CSI. The flow of the method is described as follows.

S301: a terminal device performs a CSI measurement, according to a first measurement configuration, on a specified BWP, and within the specified time, to obtain CSI measurement results.

The terminal device may measure the channel to obtain the CSI measurement results, and feedback the CSI measurement results to the base station. Since the CSI measurement results can reflect the status and attributes of the channel, the base station can select an appropriate downlink signal transmission strategy according to the indication of the CSI measurement results, to improve the performance of the communication system.

In practical applications, the CSI measurement may be based on a Cell-specific Reference Signal (CRS), or may also be based on a Channel-State Information-Reference Signal (CSI-RS). The CSI measurement result may include multiple types, for example, Channel Quality Indicator (CQI), Precoding Matrix Indicator (PMI), Rank Indicator (RI). The base station can determine the size of the transmission data block, the coding mode, and the modulation mode according to the size of the CQI, and can precode the downlink signal according to the PMI, and select an appropriate number of spatial streams to transmit the downlink signal according to the RI.

In an embodiment of the present application, the second measurement configuration may be configured by the base station for the terminal device to periodically send the measurement reference signal at a fixed period, for example, send the measurement reference signal to the terminal device at a period of 5 ms (milliseconds). Correspondingly, the terminal device will also periodically feedback the CSI measurement results to the base station at a fixed period, for example, feedback the CSI measurement results to the base station at a period of 10 ms. The first measurement configuration means that the base station configures a shorter reporting period of the CSI measurement results for the terminal device and broadcasts a reference signal at a shorter broadcast period compared to the second measurement configuration. For example, the period for the base station to send the measurement reference signal to the terminal device is 3 ms, and the reporting period configured for the terminal device is 6 ms, so the period for the terminal device to feedback the CSI measurement results to the base station is 6 ms, shortening the time of the base station to wait for the terminal device to perform the CSI measurement and report, and thus improving the utilization efficiency of wireless resources. It should be noted here that, in the following introduction, the CSI measurement and reporting method, in which the base station sends the measurement reference signal at a fixed period and the terminal device feeds back the CSI measurement results to the base station at a fixed period, is referred to as conventional CSI measurement and reporting, and the method in which the base station sends the measurement reference signal at a shorter period and the terminal device reports the CSI measurement results to the base station at a shorter period is referred to as faster CSI measurement and reporting. Here, the measurement method corresponding to the first measurement configuration can be understood as faster CSI measurement and reporting, or shorter CSI measurement and reporting, or faster CSI reporting, or shorter CSI reporting, etc.

For step S301, the detailed description will be given from the following aspects.

Aspect 1:

The terminal device determines whether the specified BWP is configured with the first measurement configuration. When the specified BWP is configured with the first measurement configuration, the terminal device performs a CSI measurement according to the first measurement configuration on the specified BWP and within the specified time to obtain the CSI measurement results.

In one embodiment, the terminal device determines whether the specified BWP is configured with the first measurement configuration; if the specified BWP is configured with the first measurement configuration, the terminal device performs the CSI measurement according to the first measurement configuration on the specified BWP to obtain the CSI measurement results; if the specified BWP is not configured with the first measurement configuration, the terminal device performs a measurement according to the second measurement configuration. In this case, the specified BWP may be preset or may be configured by the base station for the terminal device, which is not limited here.

In one embodiment, the terminal device needs to determine whether there is indication information to perform the CSI measurement and reporting according to the first measurement configuration; if the terminal device receives the indication information from the network device to instruct the terminal to perform the CSI measurement and reporting according to the first measurement configuration on the specified BWP and the specified BWP is configured with the first measurement configuration, then the terminal device performs the CSI measurement according to the first measurement configuration on the specified BWP to obtain the CSI measurement results.

In an embodiment of the present application or in a specified scenario, the UE performs the CSI measurement and reporting according to the first measurement configuration on the specified BWP, that is, the base station specifies the BWP configured with the first measurement configuration to the terminal device. In this case, the terminal device does not need to make the above determination, and directly performs the CSI measurement according to the first measurement configuration on the specified BWP to obtain the measurement results.

Aspect 2: Application Scenarios.

In many application scenarios, the terminal device can perform the CSI measurement and reporting according to the first measurement configuration, so that the network device schedules the UE quickly. The following application scenarios are given as examples, but the present application is not limited to these application scenarios.

Application Scenario 1: Cell Handover.

When the communication quality of the cell where the terminal device is currently located cannot meet the requirements, the terminal device needs to switch from the current cell to another cell in order to maintain the uninterrupted communication of the terminal device. When the terminal device performs the cell handover, the base station and the core network remain in the connected state and there is data to be transmitted, and the terminal device and the base station are in the interrupted state. After the terminal device completes the cell handover, the terminal device resumes the air interface connection with the base station. At this time, the base station needs to wait for the terminal device to report the CSI measurement results, and perform the reasonable scheduling on the terminal device according to the CSI measurement results.

Application Scenario 2: Radio Resource Control (RRC) Connection Reestablishment.

When the terminal device is in the RRC connection state, the RRC connection reestablishment process will be triggered if the case of handover failure, radio link failure, integrity protection failure, RRC reconfiguration failure or the like occurs. When the terminal device performs the RRC connection reestablishment, the base station and the core network remain in the connected state and there is data to be transmitted, and the terminal device and the base station are in the interrupted state. After the terminal device completes the RRC connection reestablishment, the terminal device resumes the air interface connection with the base station. At this time, the base station needs to wait for the terminal device to report the CSI measurement results, and perform the reasonable scheduling on the terminal device according to the CSI measurement results.

Application Scenario 3: RRC Connection Resume.

When the terminal device is in the inactive (RRC INACTIVE) state, the RRC connection resume process will be triggered if the terminal device needs to send the uplink data to the base station. When the terminal device performs the RRC connection resume, the base station and the core network remain in the connected state, and the terminal device and the base station are in the interrupted state. After the terminal device completes the RRC connection resume, the terminal device resumes the air interface connection with the base station. At this time, the base station needs to wait for the terminal device to report the CSI measurement results, and perform the reasonable scheduling on the terminal device according to the CSI measurement results.

Application Scenario 4: SCG Addition or PSCell Change.

In order to increase the transmission rate of the terminal device, the base station can configure an SCG for the terminal device, and the terminal device establishes an air interface connection between the terminal device and the PSCell of the target Secondary Node (SN) during the process of adding the SCG or performing the PSCell change. Here, there has been already data to be transmitted when the base station configures the SCG for the terminal device. Then, after the air interface connection between the terminal device and the base station is established, the base station needs to wait for the terminal device to perform the CSI measurement and reporting before it can perform the reasonable scheduling on the terminal device.

Application Scenario 5: BWP Switch.

When the terminal device has a service need, the base station can trigger the terminal device to perform a BWP switch. For example, when the terminal device wants to send a relatively large amount of data, it needs to switch from a BWP with a relatively small bandwidth range to a BWP with a relatively large bandwidth range. After the terminal device switches the active BWP from the source BWP to the target BWP, the base station needs to wait for the terminal device to perform the CSI measurement and reporting on the target BWP before it can perform the reasonable scheduling on the terminal device.

In combination with the above several application scenarios where terminal equipment needs to perform the CSI measurement and reporting, the following will continue to introduce when the terminal device performs the CSI measurement and reporting according to the first measurement configuration in the above several scenarios.

1. Corresponding to Application Scenario 1.

When the Terminal Device Performs a Cell Handover or when the Terminal Device completes a cell handover, the terminal device performs the CSI measurement according to the first measurement configuration on the specified BWP to obtain the CSI measurement results. The specified BWP here may be the first active downlink BWP of the PCell or the initial DL BWP of the PCell in the handover command, but it is not limited to these two BWPs.

2. Corresponding to Application Scenario 2.

When receiving an RRC connection reestablishment message from the base station, the terminal device performs the CSI measurement according to the first measurement configuration on the specified BWP to obtain the CSI measurement results.

In one embodiment, the terminal device sends an RRC connection reestablishment request to the base station in the target cell, and the base station sends an RRC connection reestablishment message to the terminal device after receiving the RRC connection reestablishment request. When receiving the RRC connection reestablishment message, the terminal device performs the CSI measurement according to the first measurement configuration on the specified BWP to obtain the CSI measurement results. The specified BWP here may be the first active downlink BWP of the PCell or the initial DL BWP of the PCell in the RRC connection reestablishment message, but it is not limited to these two BWPs.

Here, the terminal device may also perform the CSI measurement according to the first measurement configuration on the specified BWP to obtain the CSI measurement results, when receiving a first RRC reconfiguration message after the RRC connection reestablishment message. The specified BWP here may be the first active downlink BWP of the PCell or the initial DL BWP of the PCell in the RRC reconfiguration message, but it is not limited to these two BWPs.

3. Corresponding to Application Scenario 3.

When receiving an RRC connection resume message from the base station, the terminal device performs the CSI measurement according to the first measurement configuration on the specified BWP to obtain the CSI measurement results.

In one embodiment, the terminal device sends an RRC connection resume request to the base station in the target cell, and the base station sends an RRC connection resume message to the terminal device after receiving the RRC connection resume request. When receiving the RRC connection resume message, the terminal device performs the CSI measurement according to the first measurement configuration on the specified BWP to obtain the CSI measurement results. The specified BWP here may be the first active downlink BWP of the PCell or the initial DL BWP of the PCell in the RRC connection resume message, but it is not limited to these two BWPs.

Here, the terminal device may also perform the CSI measurement according to the first measurement configuration on the specified BWP to obtain the CSI measurement results, when receiving a first RRC reconfiguration message after the RRC connection resume message from the base station. The specified BWP here may be the first active downlink BWP of the PCell or the initial DL BWP of the PCell in the RRC reconfiguration message, but it is not limited to these two BWPs.

4. Corresponding to Application Scenario 4.

When the terminal device performs the SCG addition or the PSCell change, or when the terminal device completes the SCG addition or the PSCell change, the terminal device performs the CSI measurement according to the first measurement configuration on the specified BWP to obtain the CSI measurement results.

In an embodiment of the present application, when the SCG is added or when the PSCell is changed, the terminal device performs the CSI measurement according to the first measurement configuration on the specified BWP to obtain the CSI measurement results; or when the SCG addition or the PSCell change is completed, the terminal device performs the CSI measurement according to the first measurement configuration on the specified BWP to obtain the CSI measurement results. The specified BWP here may be the first active downlink BWP of the PCell or the initial DL BWP of the PCell in the RRC synchronous reconfiguration message, but it is not limited to these two BWPs.

5. Corresponding to Application Scenario 5.

When switching an active BWP from the source BWP to the target BWP, the terminal device performs the CSI measurement according to the first measurement configuration on the target BWP to obtain the CSI measurement results. In this case, the terminal device switches the active BWP from the source BWP to the target BWP when receiving a signaling triggering the BWP switch from the base station or the BWP inactivity timer expires, and the terminal device performs the CSI measurement according to the first measurement configuration on the target BWP to obtain the CSI measurement results; or the terminal device switches the active BWP from the source BWP to the target BWP when receiving a signaling triggering the BWP switch from the base station, and the terminal device performs the CSI measurement according to the first measurement configuration on the target BWP to obtain the CSI measurement results.

Here, how to trigger the terminal device to switch the active BWP from the source BWP to the target BWP will be firstly introduced. In one embodiment, the terminal device can be triggered to switch the active BWP from the source BWP to the target BWP through but not limited to the following several methods, which will be introduced respectively.

1) The terminal device receives a signaling triggering a BWP switch from the base station and switches the active BWP from the source BWP to the target BWP, for example, from BWP1 to BWP2. Here, the signaling triggering the BWP switch may be high-level signaling, such as RRC signaling or MAC Control Element (MAC CE) signaling, or may be physical layer signaling, such as Downlink Control Information (DCI) signaling.

2) When the BWP inactivity timer set by the terminal device expires, the active BWP is switched from the source BWP to the target BWP, for example, BWP1 is switched to BWP2.

When the terminal device switches the active BWP from the source BWP to the target BWP, the CSI measurement is performed according to the first measurement configuration on the target BWP to obtain the CSI measurement results. In this scenario, the specified BWP is also the target BWP.

In an embodiment of the present application, when receiving the signaling triggering the BWP switch from the base station or the BWP inactivity timer expires, the terminal device switches the active BWP from the source BWP to the target BWP, for example, from BWP1 to BWP2, and the terminal device performs the CSI measurement according to the first measurement configuration on the BWP2. In one embodiment, the terminal device receives a signaling triggering the BWP switch from the base station and switches the active BWP from the source BWP to the target BWP, for example, from BWP1 to BWP2, and the terminal device performs the CSI measurement according to the first measurement configuration on the BWP2. When the BWP inactivity timer expires, it means that the terminal device has no data to be transmitted at the current moment. In order to reduce the power consumption of the terminal device and the waste of wireless resources, the terminal device rolls back from the source BWP to the default BWP, such as BWP0. When the terminal device rolls back from BWP1 to BWP0, the terminal performs the CSI measurement according to the second measurement configuration on the BWP0 regardless of whether the BWP0 is configured with the first measurement configuration.

Aspect 3: Measurement Instruction.

In an embodiment of the present application, the specified BWP may be preset by the terminal device. For example, in the above scenario 5, the terminal device rolls back from the target BWP to the default BWP when the BWP inactivity timer expires; or the specified BWP may be configured by the base station for the terminal device, and in this case, the terminal device can receive a measurement instruction from the base station. Here, the measurement instruction includes the identification information of the specified BWP, and/or the first measurement configuration, and/or the indication information for instructing the terminal device to perform the CSI measurement and reporting according to the first measurement configuration.

How the base station sends the CSI measurement instruction will be firstly introduced below.

In one embodiment, the CSI measurement instruction can be carried in the signaling or message sent by the base station to the terminal device under different application scenarios, or configured in advance through RRC signaling, which will be introduced respectively below.

(1) The CSI measurement instruction is carried in the signaling or message sent by the base station to the terminal device under different application scenarios. The different application scenarios here are the same as the application scenarios in the Aspect 2. Each application scenario will not be repeated one by one here, and what signaling or message is used to carry the CSI measurement instruction in different application scenarios is only introduced.

A. The base station sends a CSI measurement instruction to the terminal device through the handover signaling. The handover signaling is used to instruct the terminal device to switch from the source primary cell to the target primary cell.

B. The base station sends a CSI measurement instruction to the terminal device through an RRC connection reestablishment message or a first RRC reconfiguration message after the RRC connection reestablishment message.

C. The base station sends a CSI measurement instruction to the terminal device through an RRC connection resume message or a first RRC reconfiguration message after the RRC connection resume message.

D. The base station sends a CSI measurement instruction to the terminal device through an SCG synchronous reconfiguration message. The SCG synchronous reconfiguration message is used to instruct the terminal device to add the SCG or instruct the terminal device to access the target PSCell from the source PSCell.

E. The base station sends a CSI measurement instruction to the terminal device through dedicated signaling, or the CSI measurement instruction is triggered by expiry of the BWP inactivity timer. Here, the dedicated signaling may be RRC signaling, MAC CE signaling or DCI signaling.

(2) The base station sends a CSI measurement instruction to the terminal device in advance through RRC signaling.

In one embodiment, the base station may send the CSI measurement instruction to the terminal device through the RRC signaling before sending the above signaling or message in A-E to the terminal device. For example, the base station may send the CSI measurement instruction to the terminal device through the RRC signaling before sending the signaling for triggering the terminal device to switch the active BWP from the source BWP to the target BWP, or the message that the BWP inactivity timer expires, to the terminal device. In one embodiment, when a terminal device accesses the network, the network device configures a dedicated BWP for the terminal device through RRC signaling, where the RRC signaling contains the first measurement configuration of the BWP. When the BWP switch is triggered by the DCI or timer, the terminal device performs the CSI measurement and reporting according to the first measurement configuration on the target BWP if the configuration information of the target BWP contains the first measurement configuration.

After how the base station sends the CSI measurement instruction is introduced, the content included in the CSI measurement instruction is introduced.

In an embodiment of the present application, the CSI measurement instruction may include the identification information of the specified BWP. When the CSI measurement instruction includes only the identification information of the specified BWP, the terminal device can determine whether the specified BWP is configured with the first measurement configuration. When the specified BWP is configured with the first measurement configuration, the terminal device performs the CSI measurement according to the first measurement configuration on the specified BWP to obtain the CSI measurement results.

In an embodiment of the present application, the CSI measurement instruction may include the identification information of the specified BWP and the first measurement configuration. The CSI measurement instruction may include the identification information of the specified BWP, the first measurement configuration, and the indication information for instructing the terminal device to perform the CSI measurement and reporting according to the first measurement configuration.

In an embodiment of the present application, in addition to carrying the indication information for instructing the terminal device to perform the CSI measurement and report according to the first measurement configuration in the CSI measurement instruction, it may also be implemented in several following ways, which are respectively introduced below.

Embodiment 1: the terminal device can perform the CSI measurement and report according to the first measurement configuration after receiving the signaling or message from the base station in the above cases 1-5. For example, the terminal device performs the CSI measurement and reporting according to the first measurement configuration when receiving the handover signaling, the RRC connection reestablishment message, the RRC connection resume message, the first RRC reconfiguration message after the RRC connection reestablishment message, the first RRC reconfiguration message after the RRC connection resume message, the SCG synchronous reconfiguration message or the dedicated signaling notifying the terminal device to perform the BWP switch from the base station or when the BWP inactivity timer expires.

Embodiment 2: the terminal device activates the first measurement configuration when reaching the preset position of a subframe where the CSI measurement according to the first measurement configuration is to be started, and performs the CSI measurement and reporting according to the first measurement configuration on the specified BWP.

In an embodiment of the present application, the preset position of the subframe, where the CSI measurement according to the first measurement configuration is to be started, may be pre-configured in the terminal device. For example, the base station sends the determined position of the subframe, where the CSI measurement according to the first measurement configuration is to be started, to the terminal device through the high-level signaling or physical layer signaling, and the terminal device saves the position of the subframe, after receiving the position of the subframe where the CSI measurement according to the first measurement configuration is to be started. The preset position of the subframe, where the CSI measurement according to the first measurement configuration is to be started, may also be carried in the CSI measurement instruction. The preset position of the subframe, where the CSI measurement according to the first measurement configuration is to be started, may also be stipulated by protocol.

In one embodiment, the position of the subframe, where the CSI measurement according to the first measurement configuration is to be started, may be the subframe n after the terminal device receives the RRC connection resume message, and n is an integer greater than or equal to 1; or may be the subframe n after the terminal device completes the cell handover, and n is an integer greater than or equal to 1.

In an embodiment of the present application, the terminal device may also determine the position of the subframe, where the CSI measurement according to the first measurement configuration is to be started, based on the time offset value between the position of the subframe where the CSI measurement according to the first measurement configuration is to be started and the position of the subframe where the CSI measurement instruction was sent. The first measurement configuration is activated when reaching the position of the subframe where the CSI measurement according to the first measurement configuration is to be started, and the CSI measurement and reporting is performed according to the first measurement configuration on the specified BWP. Here, the time offset value, between the position of the subframe where the CSI measurement according to the first measurement configuration is to be started and the position of the subframe where the CSI measurement instruction was sent, may be pre-configured in the terminal device or carried in the CSI measurement instruction or stipulated by protocol.

In an embodiment of the present application, the terminal device may also determine the position of the subframe, where the CSI measurement according to the first measurement configuration is to be started, based on the preset position of the subframe where the CSI measurement results are to be reported. The first measurement configuration is activated when reaching the position of the subframe where the CSI measurement according to the first measurement configuration is to be started, and the CSI measurement and reporting is performed according to the first measurement configuration on the specified BWP, and the preset position of the subframe, where the CSI measurement results are to be reported, may be pre-configured in the terminal device or carried in the CSI measurement instruction or stipulated by protocol.

Embodiment 3: the terminal device performs the CSI measurement and reporting according to the first measurement configuration on the specified BWP, when receiving the dedicated signaling from the network device. The dedicated signaling is used to instruct the terminal device to activate the first measurement configuration and start the CSI measurement, and the dedicated signaling is RRC signaling, DCI signaling or MAC CE signaling.

The following further introduced what is included in the first measurement configuration.

The first measurement configuration includes at least one or more of:
  configuration information of CSI measurement resources;
  configuration information of CSI reporting;
  effective duration, where the effective duration is used to indicate the duration in which the terminal device can perform the CSI measurement and reporting according to the first measurement configuration;
  configuration information of a time domain position for activating the first measurement configuration.
  configuration information of a time domain position for deactivating the first measurement configuration.

In an embodiment of the present application, the configuration information of CSI measurement resources may be the configuration information of a measurement reference signal for CSI measurement.

The effective duration refers to the duration in which the terminal device can perform the measurement and reporting according to the first measurement configuration. That is, after the effective duration is exceeded, the terminal device performs the CSI measurement and reporting according to the second measurement configuration. Further, in an embodiment of the present application, it is also possible to determine, the time to stop the CSI measurement according to the first measurement configuration, based on the effective duration and the position of the subframe where the CSI measurement according to the first measurement configuration is to be started, to avoid the waste of wireless resources due to the fact that the terminal device still performs the CSI measurement and reporting according to the first measurement configuration when there is no need to perform the CSI measurement and reporting according to the first measurement configuration.

In an embodiment of the present application, in addition to instructing the terminal device to perform the CSI measurement and reporting according to the first measurement configuration through the several methods in the foregoing embodiments 1 to 3, the first measurement configuration may also carry the configuration information of the time domain position for activating the first measurement configuration, for example, the position of the subframe where the CSI measurement according to the first measurement configuration is to be started, or the time offset value between the position of the subframe where the CSI measurement according to the first measurement configuration is to be stared, and the position of the subframe where the CSI measurement instruction was sent, etc. Of course, the configuration information for CSI measurement in the first measurement configuration may also carry the configuration information of the time domain position for deactivating the first measurement configuration, for example, the position of the subframe where the CSI measurement according to the first measurement configuration is to be stopped.

Furthermore, the configuration information of CSI measurement resources includes at least one or more of:
  time domain configuration of CSI measurement resources;
  frequency domain configuration of CSI measurement resources;
  BWP identifier.

In an embodiment of the present application, the configuration information of CSI measurement resources may include the time domain configuration of CSI measurement resources and the frequency domain configuration of CSI measurement resources, and for example, may be the time domain configuration and frequency domain configuration of a measurement reference signal for CSI measurement.

The configuration information of CSI reporting includes at least one or more of:
  configuration of frequency domain resources of CSI reporting;
  configuration of time domain resources of CSI reporting;
  BWP identifier.

In an embodiment of the present application, the CSI reporting configuration may include the configuration of frequency domain resources of CSI reporting and the configuration of time domain resources of CSI reporting, and for example, may be the time domain resources and frequency domain resources occupied by the terminal device to report the CSI to the base station.

In an embodiment of the present application, both the configuration information of CSI measurement resources and the configuration information of CSI reporting may include the identifier of the associated BWP, which is mainly used by the terminal device to associate the corresponding first measurement configuration according to the identification information of the BWP.

Figure 4A:
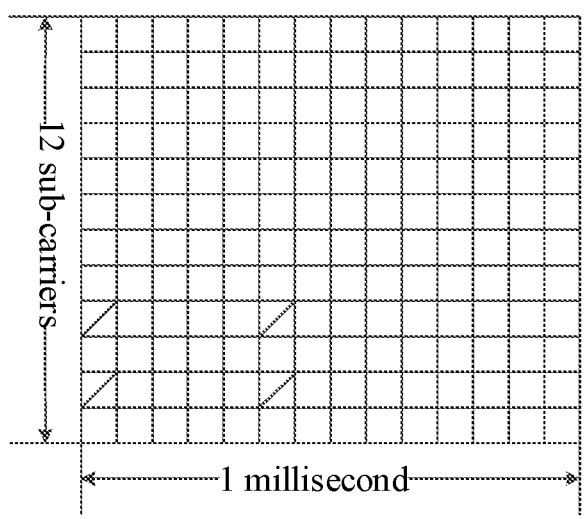
FIGS. 4A and 4B are schematic diagrams of the configuration of CSI measurement resources provided by embodiments of the present application.
Figure 4B:
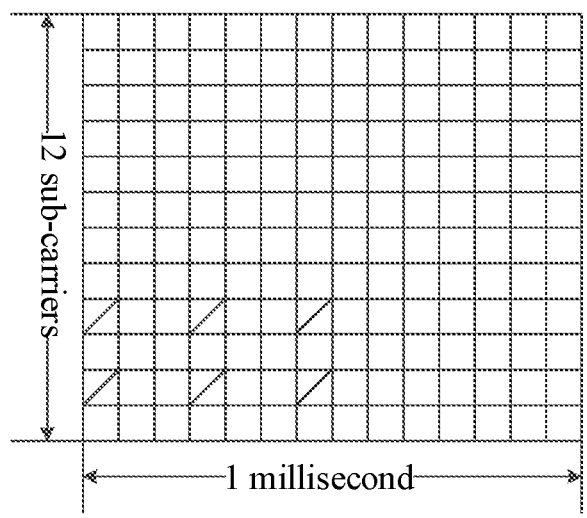

It should be noted here that the first measurement configuration is that the base station configures a shorter broadcast period of the measurement reference signal and a shorter reporting period of the CSI measurement results for the terminal device. Here, this is also reflected in that more CSI measurement resources or resources for CSI reporting are configured for the terminal device. Here, taking CSI reporting resources as an example, please refer to FIGS. 4A and 4B. FIG. 4A shows the time-frequency resources occupied by the reporting resources allocated to the terminal device for the CSI reporting configuration in the second measurement configuration, and FIG. 4B shows the time-frequency resources occupied by the reporting resources allocated to the terminal device for the CSI reporting in the first measurement configuration.

S302: the terminal device reports the CSI measurement results to the base station on the specified BWP.

In an embodiment of the present application, after completing the CSI measurement according to the first measurement configuration and obtaining the CSI measurement results, the terminal device reports the CSI measurement results to the base station on the specified BWP.

S303: the base station schedules the terminal device on the specified BWP according to the CSI measurement results.

The base station receives the CSI measurement results reported by the terminal device, and schedules the terminal device according to the CSI measurement results to realize the data transmission.

Further, in an embodiment of the present application, in addition to determining the time to stop the CSI measurement and reporting, according to the first measurement configuration based on the effective duration and the position of the subframe where the CSI measurement according to the first measurement configuration is to be stated, or according to the first measurement configuration based on the configuration information of the time-domain position for deactivating the first measurement configuration carried in the first measurement configuration, it may also be determined in the following methods.

In a first implementation method: the terminal device stops the CSI measurement and reporting when reaching a preset position of a subframe where the CSI measurement according to the first measurement configuration is to be stopped, and deactivates the first measurement configuration.

In an embodiment of the present application, the preset position of the subframe, where the CSI measurement according to the first measurement configuration is to be stopped, may be pre-configured in the terminal device. For example, the base station sends the position of the subframe, where the CSI measurement according to the first measurement configuration is to be stopped, to the terminal device through the high-level signaling or physical layer signaling, and the terminal device saves the position of the subframe, after receiving the position of the subframe where the CSI measurement according to the first measurement configuration is to be stopped. The preset position of the subframe, where the CSI measurement according to the first measurement configuration is to be stopped, may also be carried in the CSI measurement instruction, or may be a preset position stipulated by protocol.

In a second implementation method: the terminal device stops the CSI measurement and reporting according to the first measurement configuration when receiving a dedicated signaling from the base station. The dedicated signaling is used to instruct the terminal device to deactivate the first measurement configuration and stop the CSI measurement and reporting according to the first measurement configuration, and the dedicated signaling is RRC signaling, DCI signaling or MAC CE signaling.

In a third implementation method: A timer is stated upon the terminal device starting the CSI measurement, the first measurement configuration is deactivated and the CSI measurement and reporting is stopped according to the first measurement configuration when the timer expires.

In this implementation method, the timing duration of the timer may be specified by protocol or configured by the network device.

In a fourth implementation method: the terminal device stops the CSI measurement and reporting according to the first measurement configuration, and deactivates the first measurement configuration upon receiving the downlink scheduling on the specified BWP.

Here, the fourth implementation method may be used in combination with the first or third implementation method. For example, when the fourth implementation method is satisfied, the CSI measurement and reporting according to the first measurement configuration is stopped. In one embodiment, when the first or third implementation method is satisfied, the CSI measurement and reporting according to the first measurement configuration is stopped.

The devices provided by the embodiments of the present application will be introduced below with reference to the drawings of the specification.

Figure 5:
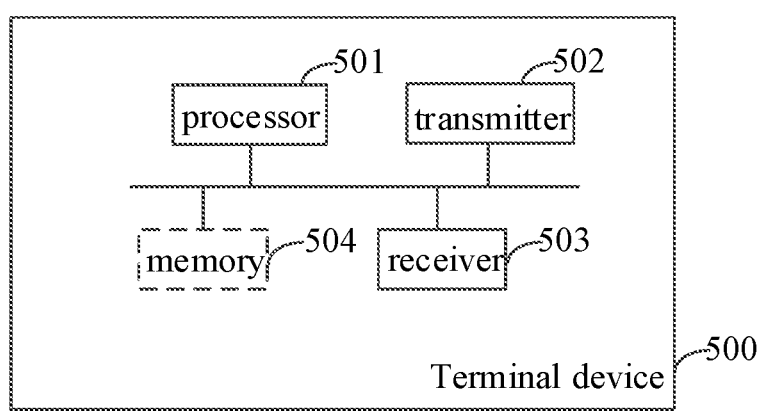
FIG. 5 is a terminal device provided by an embodiment of the present application.

Referring to FIG. 5, based on the same inventive concept, an embodiment of the present application provides a terminal device 500. In an embodiment, the terminal device includes a processor 501, a transmitter 502, a receiver 503 and a memory 504, where the transmitter 502, receiver 503 and memory 504 are coupled to the processor 501. The processor 501 may be a Central Processing Unit (CPU) or an Application-Specific Integrated Circuit (ASIC), or may be one or more integrated circuits for controlling the program execution, or may be a baseband chip, etc. There may be one or more memories, and the memory may be a Read Only Memory (ROM), a Random Access Memory (RAM) or a magnetic disk memory, etc.

By designing and programming the processor 501, the codes corresponding to the aforementioned the method for measuring and reporting CSI can be solidified into a chip so that the chip can execute the following steps during operation:

performing a CSI measurement according to a first measurement configuration on a specified BWP and within specified time to obtain a CSI measurement results.

The transmitter 502 is configured to report the CSI measurement results to a network device on the specified BWP under control of the processor 501;

where the terminal device performs a CSI measurement according to a second measurement configuration outside the specified time.

In a possible embodiment, the processor 501 is configured to:
  perform the CSI measurement according to the first measurement configuration on the specified BWP and within the specified time to obtain the CSI measurement results, when the terminal device performs a cell handover or when the terminal device completes a cell handover; and/or
  perform the CSI measurement according to the first measurement configuration on the specified BWP and within the specified time to obtain the CSI measurement results, when receiving an RRC connection reestablishment message from the network device; and/or
  perform the CSI measurement according to the first measurement configuration on the specified BWP and within the specified time to obtain the CSI measurement results, when receiving an RRC connection resume message from the network device; and/or
  perform the CSI measurement according to the first measurement configuration on the specified BWP and within the specified time to obtain the CSI measurement results, when receiving a first RRC reconfiguration message after an RRC connection reestablishment message from the network device, or when receiving a first RRC reconfiguration message after an RRC connection resume message from the network device; and/or
  perform the CSI measurement according to the first measurement configuration on the specified BWP and within the specified time to obtain the CSI measurement results, when the terminal device performs SCG addition or PSCell change or when the terminal device completes SCG addition or PSCell change.

In a possible embodiment,
  the specified BWP is a first active downlink BWP specified by a PCell or an initial downlink BWP specified by the PCell; and/or
  the specified BWP is a first active downlink BWP specified by a PSCell or an initial downlink BWP specified by the PSCell.

In a possible embodiment, the processor 501 is configured to:
  perform the CSI measurement according to the first measurement configuration on a target BWP and within the specified time to obtain the CSI measurement results when switching an active BWP from a source BWP to the target BWP;
  where the terminal device switches the active BWP from the source BWP to the target BWP when receiving a signaling triggering a BWP switch from the network device or when a BWP inactivity timer expires; or the terminal device switches the active BWP from the source BWP to the target BWP when receiving a signaling triggering a BWP switch from the network device.

In a possible embodiment, the processor 501 is configured to:
  determine whether the specified BWP is configured with the first measurement configuration; and
  perform the CSI measurement according to the first measurement configuration on the specified BWP and within the specified time to obtain the CSI measurement results when the specified BWP is configured with the first measurement configuration.

In a possible embodiment, the terminal device further includes:
  a receiver 503 configured to receive a CSI measurement instruction from the network device; where the CSI measurement instruction carries the identification information of the specified BWP, and/or the CSI measurement instruction carries the first measurement configuration, and/or the CSI measurement instruction carries the indication information for instructing the terminal device to perform the CSI measurement and reporting according to the first measurement configuration within the specified time.

In a possible embodiment, the receiver 503 is configured to:
  receive the CSI measurement instruction from the network device through handover signaling; where the handover signaling instructs the terminal device to switch from a source primary cell to a target primary cell; and/or
  receive the CSI measurement instruction from the network device through an RRC connection reestablishment message; and/or
  receive the CSI measurement instruction from the network device through an RRC connection resume message; and/or
  receive the CSI measurement instruction from the network device through a first RRC reconfiguration message after receiving an RRC connection reestablishment message or through a first RRC reconfiguration message after receiving an RRC connection resume message; and/or
  receive the CSI measurement instruction from the network device through an SCG synchronous reconfiguration message; where the SCG synchronous reconfiguration message instructs the terminal device to add an SCG or instructs the terminal device to access to a target PSCell from a source PSCell; and/or
  receive the CSI measurement instruction from the network device through dedicated signaling, or the CSI measurement instruction triggered by expiry of a BWP inactivity timer; where the dedicated signaling or the expiry of the BWP inactivity timer triggers the terminal device to perform BWP switch from a source BWP to a target BWP, and the dedicated signaling is RRC signaling, DCI signaling, or MAC CE signaling; and/or
  receive the CSI measurement instruction from the network device through RRC signaling.

In a possible embodiment, the processor 501 is configured to:
  activate the first measurement configuration when reaching a preset position of a subframe where the CSI measurement according to the first measurement configuration is to be started, and perform the CSI measurement and reporting according to the first measurement configuration on the specified BWP; or
  perform the CSI measurement and reporting according to the first measurement configuration on the specified BWP when receiving a dedicated signaling from the network device; where the dedicated signaling instructs the terminal device to activate the first measurement configuration and perform the CSI measurement and reporting according to the first measurement configuration, and the dedicated signaling is RRC signaling, DCI signaling or MAC CE signaling.

In a possible embodiment, the processor 501 is further configured to:
  stop the CSI measurement and reporting according to the first measurement configuration when reaching a preset position of a subframe where the CSI measurement according to the first measurement configuration is to be stopped, and deactivate the first measurement configuration; or stop the CSI measurement and reporting according to the first measurement configuration when receiving a dedicated signaling from the network device; where the dedicated signaling instructs the terminal device to deactivate the first measurement configuration and stop the CSI measurement and reporting according to the first measurement configuration, and the dedicated signaling is RRC signaling, DCI signaling or MAC CE signaling; or start a timer upon starting the CSI measurement according to the first measurement configuration by the terminal device, deactivate the first measurement configuration, and stop the CSI measurement and reporting according to the first measurement configuration when the timer expires; or stop the CSI measurement and reporting according to the first measurement configuration, and deactivate the first measurement configuration upon receiving downlink scheduling on the specified BWP.

In a possible embodiment, the first measurement configuration includes at least one or more of:
configuration information of CSI measurement resources;
configuration information of CSI reporting;
effective duration, where the effective duration indicates a duration for which the terminal device is able to perform the CSI measurement and reporting according to the first measurement configuration;
configuration information of a time domain position for activating the first measurement configuration;
configuration information of a time domain position for deactivating the first measurement configuration.

In a possible embodiment, the configuration information of CSI measurement resources includes at least one or more of:
time domain configuration of CSI measurement resources;
frequency domain configuration of CSI measurement resources;
BWP identifier;
the configuration information of CSI reporting includes at least one or more of:
configuration of frequency domain resources of CSI reporting;
configuration of time domain resources of CSI reporting;
BWP identifier.

In a possible embodiment,
a broadcast period of a measurement reference signal included in the first measurement configuration is less than a broadcast period of a measurement reference signal included in the second measurement configuration; and/or
a CSI reporting period included in the first measurement configuration is less than a CSI reporting period included in the second measurement configuration.

Figure 6:
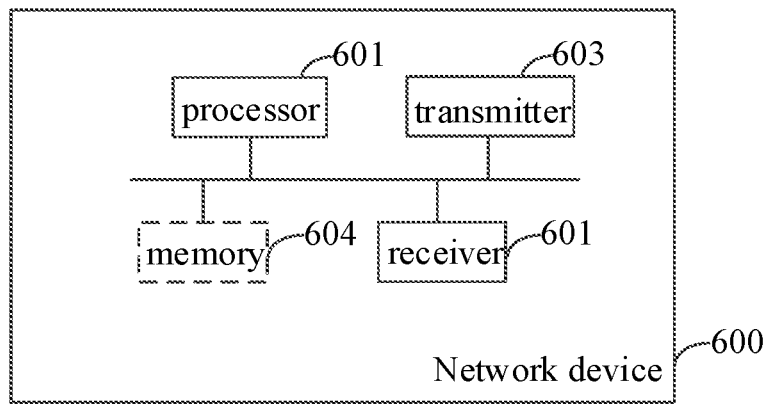
FIG. 6 is a network device provided by an embodiment of the present application.

Referring to FIG. 6, the present application provides a network device 600. In an embodiment, the network device includes a receiver 601, a processor 602, a transmitter 603 and a memory 604, where the receiver 601, transmitter 603 and memory 604 are coupled to the processor 602. The processor 602 may be a Central Processing Unit (CPU) or an Application-Specific Integrated Circuit (ASIC), or may be one or more integrated circuits for controlling the program execution, or may be a baseband chip, etc. There may be one or more memories, and the memory may be a Read Only Memory (ROM), a Random Access Memory (RAM) or a magnetic disk memory, etc.

By designing and programming the processor 602, the codes corresponding to the aforementioned the method for measuring and reporting CSI can be solidified into a chip so that the chip can execute the following steps during operation:
controlling the receiver 601 to receive CSI measurement results reported by a terminal device through a specified BWP; and scheduling the terminal device on the specified BWP according to the CSI measurement results; where the CSI measurement results are obtained by the terminal device performing a CSI measurement according to the first measurement configuration on the specified BWP and within specified time;
where the network device receives measurement results reported by the terminal device and obtained by performing a CSI measurement according to a second measurement configuration outside the specified time.

In a possible embodiment, the receiver 601 is configured to:
receive the CSI measurement results reported by the terminal device through the specified BWP when the terminal device performs a cell handover or when the terminal device completes a cell handover; and/or
receive the CSI measurement results reported by the terminal device through the specified BWP after the terminal device receives an RRC connection re-establishment message from the network device; and/or
receive the CSI measurement results reported by the terminal device through the specified BWP after the terminal device receives an RRC connection resume message from the network device; and/or
receive the CSI measurement results reported by the terminal device through the specified BWP after the terminal device receives a first RRC reconfiguration message after an RRC connection reestablishment message from the network device, or after the terminal device receives a first RRC reconfiguration message after an RRC connection resume message from the network device; and/or
receive the CSI measurement results reported by the terminal device through the specified BWP when the terminal device performs SCG addition or PSCell change or when the terminal device completes SCG addition or PSCell change.

In a possible embodiment,
the specified BWP is a first active downlink BWP specified by a PCell or an initial downlink BWP specified by the PCell; and/or
the specified BWP is a first active downlink BWP specified by a PSCell or an initial downlink BWP specified by the PSCell.

In a possible embodiment, the receiver 602 is configured to:
receive the CSI measurement results reported by the terminal device through a target BWP when the terminal device switches an active BWP from a source BWP to the target BWP;
where the network device sends a signaling triggering a BWP switch to the terminal device to trigger the terminal device to switch the active BWP from the source BWP to the target BWP, or the network device configures a BWP inactivity timer for the terminal device, to trigger the terminal device to switch the active BWP from the source BWP to the target BWP when the timer expires; or the network device sends a signaling triggering a BWP switch to the terminal device, to trigger the terminal device to switch the active BWP from the source BWP to the target BWP.

In a possible embodiment, the network device further includes:

a transmitter 603 configured to send a CSI measurement instruction to the terminal device; where the CSI measurement instruction carries the identification information of the specified BWP, and/or the CSI measurement instruction carries the first measurement configuration, and/or the CSI measurement instruction carries the indication information for instructing the terminal device to perform the CSI measurement and reporting according to the first measurement configuration within the specified time.

In a possible embodiment, the transmitter 603 is configured to:

send the CSI measurement instruction to the terminal device through handover signaling; where the handover signaling instructs the terminal device to switch from a source primary cell to a target primary cell; and/or send the CSI measurement instruction to the terminal device through an RRC connection re-establishment message; and/or send the CSI measurement instruction to the terminal device through an RRC connection resume message; and/or send the CSI measurement instruction to the terminal device through a first RRC reconfiguration message after sending an RRC connection reestablishment message or through a first RRC reconfiguration message after sending an RRC connection resume message; and/or send the CSI measurement instruction to the terminal device through an SCG synchronous reconfiguration message; where the SCG synchronous reconfiguration message instructs the terminal device to add an SCG or instructs the terminal device to switch from a source PSCell to a target PSCell; and/or send the CSI measurement instruction to the terminal device through dedicated signaling, or configure a BWP inactivity timer for the terminal device to trigger the CSI measurement instruction of the terminal device when the BWP inactivity timer expires; where the dedicated signaling or the expiry of the BWP inactivity timer triggers the terminal device to switch an active BWP from a source BWP to a target BWP, and the dedicated signaling is RRC signaling, DCI signaling or MAC CE signaling; and/or send the CSI measurement instruction to the terminal device through RRC signaling.

In a possible embodiment, the transmitter 603 is further configured to:

send a dedicated signaling to the terminal device so that the terminal device performs the CSI measurement and reporting according to the first measurement configuration on the specified BWP; where the dedicated signaling instructs the terminal device to activate the first measurement configuration and perform the CSI measurement and reporting according to the first measurement configuration, and the dedicated signaling is RRC signaling, DCI signaling or MAC CE signaling.

In a possible embodiment, the transmitter 603 is further configured to:

send a dedicated signaling to the terminal device so that the terminal device stops the CSI measurement and reporting according to the first measurement configuration; where the dedicated signaling instructs the terminal device to deactivate the first measurement configuration and stop the CSI measurement and reporting according to the first measurement configuration, and the dedicated signaling is RRC signaling, DCI signaling or MAC CE signaling.

In a possible embodiment, the first measurement configuration includes at least one or more of:

configuration information of CSI measurement resources;
configuration information of CSI reporting;
effective duration, where the effective duration indicates a duration for which the terminal device is able to perform the CSI measurement and reporting according to the first measurement configuration;
configuration information of a time domain position for activating the first measurement configuration;
configuration information of a time domain position for deactivating the first measurement configuration.

In a possible embodiment, the configuration information of CSI measurement resources includes at least one or more of:

time domain configuration of CSI measurement resources;
frequency domain configuration of CSI measurement resources;
BWP identifier;
the configuration information of CSI reporting includes at least one or more of:
configuration of frequency domain resources of CSI reporting;
configuration of time domain resources of CSI reporting;
BWP identifier.

In a possible embodiment, a broadcast period of a measurement reference signal included in the first measurement configuration is less than a broadcast period of a measurement reference signal included in the second measurement configuration; and/or
a CSI reporting period included in the first measurement configuration is less than a CSI reporting period included in the second measurement configuration.

Figure 7:
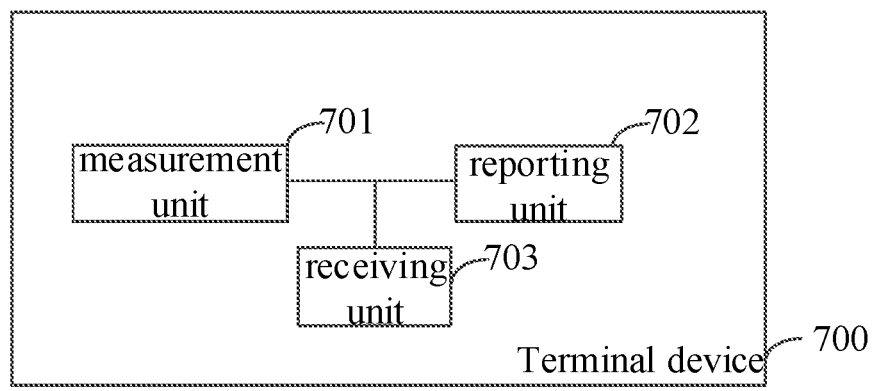
FIG. 7 is another terminal device provided by an embodiment of the present application.

Referring to FIG. 7, the present application provides a terminal device 700, including:

a measurement device 701 configured to perform a CSI measurement according to a first measurement configuration on a specified BWP and within specified time to obtain CSI measurement results; and
a reporting device 702 configured to report the CSI measurement results to a network device on the specified BWP;
where the terminal device performs a CSI measurement according to a second measurement configuration outside the specified time.

In a possible embodiment, when performing the CSI measurement according to the first measurement configuration on the specified BWP and within the specified time to obtain the CSI measurement results, the measurement device 701 is further configured to:

perform the CSI measurement according to the first measurement configuration on the specified BWP and within the specified time to obtain the CSI measurement results when the terminal device performs a cell handover or when the terminal device completes a cell handover; and/or perform the CSI measurement according to the first measurement configuration on the specified BWP and within the specified time to obtain the CSI measurement results when receiving an RRC connection reestablishment message from the network device; and/or perform the CSI measurement according to the first measurement configuration on the specified BWP and within the specified time to obtain the CSI measurement results when receiving an RRC connection resume message from the network device; and/or perform the CSI measurement according to the first measurement configuration on the specified BWP and within the specified time to obtain the CSI measurement results when receiving a first RRC reconfiguration message after an RRC connection reestablishment message from the network device or when receiving a first RRC reconfiguration message after an RRC connection resume message from the network device; and/or perform the CSI measurement according to the first measurement configuration on the specified BWP and within the specified time to obtain the CSI measurement results when the terminal device performs SCG addition or PSCell change or when the terminal device completes SCG addition or PSCell change.

In a possible embodiment, characterized in that:

the specified BWP is a first active downlink BWP specified by a PCell or an initial downlink BWP specified by the PCell; and/or the specified BWP is a first active downlink BWP specified by a PSCell or an initial downlink BWP specified by the PSCell.

In a possible embodiment, when performing the CSI measurement according to the first measurement configuration on the specified BWP and within the specified time to obtain the CSI measurement results, the measurement device 701 is further configured to:

perform the CSI measurement according to the first measurement configuration on a target BWP and within the specified time to obtain the CSI measurement results when switching an active BWP from a source BWP to the target BWP;

where the terminal device switches the active BWP from the source BWP to the target BWP when receiving a signaling triggering a BWP switch from the network device or when a BWP inactivity timer expires; or the terminal device switches the active BWP from the source BWP to the target BWP when receiving a signaling triggering a BWP switch from the network device.

In a possible embodiment, when performing the CSI measurement according to the first measurement configuration on the specified BWP and within the specified time to obtain the CSI measurement results, the measurement device 701 is further configured to:

determine whether the specified BWP is configured with the first measurement configuration; and perform the CSI measurement according to the first measurement configuration on the specified BWP and within the specified time to obtain the CSI measurement results when the specified BWP is configured with the first measurement configuration.

In a possible embodiment, the terminal device further includes:

a receiving device 703 configured to receive a CSI measurement instruction from the network device; where the CSI measurement instruction carries the identification information of the specified BWP, and/or the CSI measurement instruction carries the first measurement configuration, and/or the CSI measurement instruction carries the indication information for instructing the terminal device to perform the CSI measurement and reporting according to the first measurement configuration within the specified time.

In a possible embodiment, when receiving the CSI measurement instruction from the network device, the receiving device 703 is further configured to:

receive the CSI measurement instruction from the network device through handover signaling; where the handover signaling instructs the terminal device to switch from a source primary cell to a target primary cell; and/or receive the CSI measurement instruction from the network device through an RRC connection reestablishment message; and/or receive the CSI measurement instruction from the network device through an RRC connection resume message; and/or receive the CSI measurement instruction from the network device through a first RRC reconfiguration message after receiving an RRC connection reestablishment message or through a first RRC reconfiguration message after receiving an RRC connection resume message; and/or receive the CSI measurement instruction from the network device through an SCG synchronous reconfiguration message; where the SCG synchronous reconfiguration message instructs the terminal device to add an SCG or instructs the terminal device to access to a target PSCell from a source PSCell; and/or receive the CSI measurement instruction from the network device through dedicated signaling or the CSI measurement instruction triggered by expiry of a BWP inactivity timer; and the dedicated signaling or the expiry of the BWP inactivity timer triggers the terminal device to perform BWP switch from a source BWP to a target BWP, and the dedicated signaling is RRC signaling, DCI signaling, or MAC CE signaling; and/or receive the CSI measurement instruction from the network device through RRC signaling.

In a possible embodiment, when performing the CSI measurement according to the first measurement configuration on the specified BWP and within the specified time to obtain the CSI measurement results, the measurement device 701 is further configured to:

activate the first measurement configuration when reaching a preset position of a subframe where the CSI measurement according to the first measurement configuration is to be started, and perform the measurement and reporting according to the first measurement configuration on the specified BWP; or perform the CSI measurement and reporting according to the first measurement configuration on the specified BWP when receiving a dedicated signaling from the network device; where the dedicated signaling instructs the terminal device to activate the first measurement configuration and perform the CSI measurement and reporting according to the first measurement configuration, and the dedicated signaling is RRC signaling, DCI signaling or MAC CE signaling.

In a possible embodiment, the measurement device 701 is further configured to:

stop the CSI measurement and reporting according to the first measurement configuration, when reaching a preset position of a subframe where the CSI measurement according to the first measurement configuration is to be stopped, and deactivate the first measurement configuration; or stop the CSI measurement and reporting according to the first measurement configuration when receiving a dedicated signaling from the network device; where the dedicated signaling instructs the terminal device to deactivate the first measurement configuration and stop the CSI measurement and reporting according to the first measurement configuration, and the dedicated signaling is RRC signaling, DCI signaling or MAC CE signaling; or start a timer upon starting the CSI measurement according to the first measurement configuration by the terminal device, and deactivate the first measurement configuration and stop the CSI measurement and reporting according to the first measurement configuration when the timer expires; or stop the CSI measurement and reporting according to the first measurement configuration and deactivate the first measurement configuration upon receiving downlink scheduling on the specified BWP.

In a possible embodiment, the first measurement configuration includes at least one or more of:
configuration information of CSI measurement resources;
configuration information of CSI reporting;
effective duration, where the effective duration indicates a duration for which the terminal device is able to perform the CSI measurement and reporting according to the first measurement configuration;
configuration information of a time domain position for activating the first measurement configuration;
configuration information of a time domain position for deactivating the first measurement configuration.

In a possible embodiment, the configuration information of CSI measurement resources includes at least one or more of:
time domain configuration of CSI measurement resources;
frequency domain configuration of CSI measurement resources;
BWP identifier;
the configuration information of CSI reporting includes at least one or more of:
configuration of frequency domain resources of CSI reporting;
configuration of time domain resources of CSI reporting;
BWP identifier.

In a possible embodiment,
a broadcast period of a measurement reference signal included in the first measurement configuration is less than a broadcast period of a measurement reference signal included in the second measurement configuration; and/or
a CSI reporting period included in the first measurement configuration is less than a CSI reporting period included in the second measurement configuration.

Figure 8:
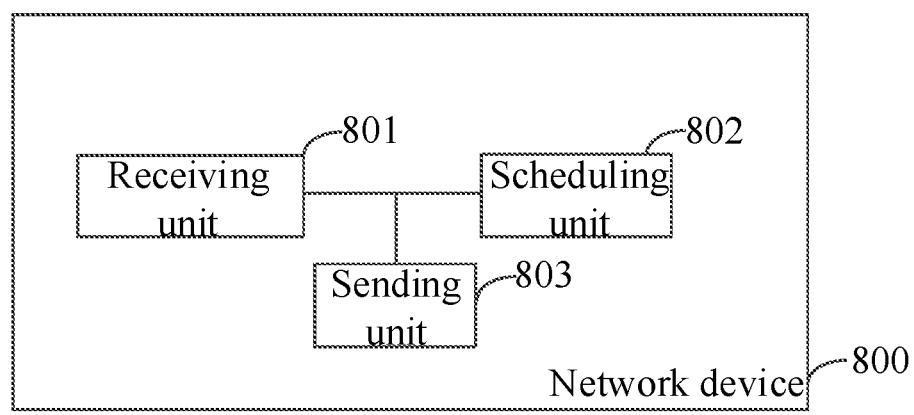
FIG. 8 is another network device provided by an embodiment of the present application.

Referring to FIG. 8, the present application provides a network device 800, including:
a receiving device 801 configured to receive CSI measurement results reported by a terminal device through a specified BWP, where the CSI measurement results are obtained by the terminal device performing a CSI measurement according to the first measurement configuration on the specified BWP and within specified time;

a scheduling device 802 configured to schedule the terminal device on the specified BWP according to the CSI measurement results;
and the network device receives CSI measurement results reported by the terminal device and obtained by performing a CSI measurement according to a second measurement configuration outside the specified time.

In a possible embodiment, when receiving the CSI measurement results reported by the terminal device through the specified BWP, the receiving device 801 is further configured to:
receive the CSI measurement results reported by the terminal device through the specified BWP when the terminal device performs a cell handover or when the terminal device completes a cell handover; and/or
receive the CSI measurement results reported by the terminal device through the specified BWP after the terminal device receives an RRC connection reestablishment message from the network device; and/or
receive the CSI measurement results reported by the terminal device through the specified BWP after the terminal device receives an RRC connection resume message from the network device; and/or
receive the CSI measurement results reported by the terminal device through the specified BWP after the terminal device receives a first RRC reconfiguration message after an RRC connection reestablishment message from the network device or after the terminal device receives a first RRC reconfiguration message after an RRC connection resume message from the network device; and/or
receive the CSI measurement results reported by the terminal device through the specified BWP when the terminal device performs SCG addition or PSCell change or when the terminal device completes SCG addition or PSCell change.

In a possible embodiment,
the specified BWP is a first active downlink BWP specified by a PCell or an initial downlink BWP specified by the PCell; and/or
the specified BWP is a first active downlink BWP specified by a PSCell or an initial downlink BWP specified by the PSCell.

In a possible embodiment, when receiving the CSI measurement results reported by the terminal device through the specified BWP, the receiving device 801 is further configured to:
receive the CSI measurement results reported by the terminal device through a target BWP when the terminal device switches an active BWP from a source BWP to the target BWP;
where the network device sends a signaling triggering a BWP switch to the terminal device to trigger the terminal device to switch the active BWP from the source BWP to the target BWP, or the network device configures a BWP inactivity timer for the terminal device, to trigger the terminal device to switch the active BWP from the source BWP to the target BWP when the BWP inactivity timer expires; or the network device sends a signaling triggering a BWP switch to the terminal device, to trigger the terminal device to switch the active BWP from the source BWP to the target BWP.

In a possible embodiment, the network device further includes:
a sending device 803 configured to send a CSI measurement instruction to the terminal device; and the CSI measurement instruction carries the identification information of the specified BWP, and/or the CSI measurement instruction carries the first measurement configuration, and/or the CSI measurement instruction carries the indication information for instructing the terminal device to perform the CSI measurement and reporting according to the first measurement configuration within the specified time.

In a possible embodiment, when sending the CSI measurement instruction to the terminal device, the sending device 803 is further configured to:

send the CSI measurement instruction to the terminal device through handover signaling; where the handover signaling instructs the terminal device to switch from a source primary cell to a target primary cell; and/or send the CSI measurement instruction to the terminal device through an RRC connection re-establishment message; and/or send the CSI measurement instruction to the terminal device through an RRC connection resume message; and/or send the CSI measurement instruction to the terminal device through a first RRC reconfiguration message after sending an RRC connection reestablishment message or through a first RRC reconfiguration message after sending an RRC connection resume message; and/or send the CSI measurement instruction to the terminal device through an SCG synchronous reconfiguration message; where the SCG synchronous reconfiguration message instructs the terminal device to add an SCG or instructs the terminal device to switch from a source PSCell to a target PSCell; and/or send the CSI measurement instruction to the terminal device through dedicated signaling, or configure a BWP inactivity timer for the terminal device to trigger the CSI measurement instruction of the terminal device when the BWP inactivity timer expires; where the dedicated signaling or the expiry of the BWP inactivity timer triggers the terminal device to switch an active BWP from a source BWP to a target BWP, and the dedicated signaling is RRC signaling, DCI signaling, or MAC CE signaling; and/or send the CSI measurement instruction to the terminal device through RRC signaling.

In a possible implementation, the sending device 803 is further configured to:

send a dedicated signaling to the terminal device so that the terminal device performs the CSI measurement and reporting according to the first measurement configuration on the specified BWP; where the dedicated signaling instructs the terminal device to activate the first measurement configuration and perform the CSI measurement and reporting according to the first measurement configuration, and the dedicated signaling is RRC signaling, DCI signaling or MAC CE signaling.

In a possible embodiment, the sending device 803 is further configured to:

send a dedicated signaling to the terminal device so that the terminal device stops the CSI measurement and reporting according to the first measurement configuration; where the dedicated signaling instructs the terminal device to deactivate the first measurement configuration and stop the CSI measurement and reporting according to the first measurement configuration, and the dedicated signaling is RRC signaling, DCI signaling or MAC CE signaling.

In a possible embodiment, the first measurement configuration includes at least one or more of:
configuration information of CSI measurement resources;
configuration information of CSI reporting;
effective duration, where the effective duration indicates a duration for which the terminal device is able to perform the CSI measurement and reporting according to the first measurement configuration;
configuration information of a time domain position for activating the first measurement configuration;
configuration information of a time domain position for deactivating the first measurement configuration.

In a possible embodiment, the configuration information of CSI measurement resources includes at least one or more of:
time domain configuration of CSI measurement resources;
frequency domain configuration of CSI measurement resources;
BWP identifier;
the configuration information of CSI reporting includes at least one or more of:
configuration of frequency domain resources of CSI reporting;
configuration of time domain resources of CSI reporting;
BWP identifier.

In a possible embodiment,
a broadcast period of a measurement reference signal included in the first measurement configuration is less than a broadcast period of a measurement reference signal included in the second measurement configuration; and/or
a CSI reporting period included in the first measurement configuration is less than a CSI reporting period included in the second measurement configuration.

An embodiment of the present application further provides a computer storage medium. The storage medium may include a memory that may store a program. When the program is executed, it includes all the steps performed by the terminal device and the network device as recorded in the above method embodiments shown in FIG. 3.

It should be understood that the embodiments of the present application can provide methods, systems and computer program products. Thus the embodiments of the present application can take the form of hardware embodiments alone, software embodiments alone, or embodiments combining the software and hardware aspects. Also the embodiments of the present application can take the form of computer program products implemented on one or more computer usable storage mediums (including but not limited to magnetic disk memories, CD-ROMs, optical memories and the like) containing computer usable program codes therein.

The embodiments of the present application are described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which guides the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

What is claimed is:

1. A method for measuring and reporting Channel State Information (CSI), comprising:
performing, by a terminal device, a CSI measurement, according to a first measurement configuration, on a specified Bandwidth Part (BWP), and within specified time, to obtain CSI measurement results; and
reporting, by the terminal device, the CSI measurement results to a network device on the specified BWP;
wherein the terminal device performs a CSI measurement on the specified BWP according to a second measurement configuration outside the specified time;
wherein the method further comprises:
receiving, by the terminal device, a CSI measurement instruction from the network device, wherein
the CSI measurement instruction carries identification information of the specified BWP, and/or
the CSI measurement instruction carries the first measurement configuration, and/or
the CSI measurement instruction carries indication information for instructing the terminal device to perform the CSI measurement and reporting according to the first measurement configuration.

2. The method of claim 1, wherein the performing, by the terminal device, the CSI measurement, according to the first measurement configuration, on the specified BWP, and within the specified time, to obtain the CSI measurement results, comprises:
performing, by the terminal device, the CSI measurement, according to the first measurement configuration, on the specified BWP, and within the specified time, to obtain the CSI measurement results, when the terminal device performs a cell handover, or when the terminal device completes a cell handover; and/or
performing, by the terminal device, the CSI measurement, according to the first measurement configuration, on the specified BWP, and within the specified time, to obtain the CSI measurement results, when receiving a Radio Resource Control (RRC) connection reestablishment message from the network device; and/or
performing, by the terminal device, the CSI measurement, according to the first measurement configuration, on the specified BWP, and within the specified time, to obtain the CSI measurement results, when receiving an RRC connection resume message from the network device; and/or
performing, by the terminal device, the CSI measurement, according to the first measurement configuration, on the specified BWP, and within the specified time, to obtain the CSI measurement results, when receiving a first RRC reconfiguration message after an RRC connection reestablishment message from the network device, or when receiving a first RRC reconfiguration message after an RRC connection resume message from the network device; and/or
performing, by the terminal device, the CSI measurement, according to the first measurement configuration, on the specified BWP, and within the specified time, to obtain the CSI measurement results, when the terminal device performs Secondary Cell Group (SCG) addition or Primary SCG Cell (PSCell) change, or when the terminal device completes SCG addition or PSCell change; and/or
performing, by the terminal device, the CSI measurement, according to the first measurement configuration, on a target BWP, and within the specified time to obtain the CSI measurement results, when switching an active BWP from a source BWP to the target BWP, wherein the terminal device switches the active BWP from the source BWP to the target BWP, when receiving a signaling triggering a BWP switch from the network device, or when a BWP inactivity timer expires; or the terminal device switches the active BWP from the source BWP to the target BWP, when receiving a signaling triggering a BWP switch from the network device.

3. The method of claim 1, wherein
the specified BWP is a first active downlink BWP specified by a Primary Cell (PCell), or an initial downlink BWP specified by the PCell; and/or
the specified BWP is a first active downlink BWP specified by a Primary SCG Cell (PSCell), or an initial downlink BWP specified by the PSCell.

4. The method of claim 1,
wherein the receiving, by the terminal device, the CSI measurement instruction from the network device, comprises:
receiving, by the terminal device, the CSI measurement instruction from the network device through handover signaling, wherein the handover signaling instructs the terminal device to switch from a source primary cell to a target primary cell; and/or
receiving, by the terminal device, the CSI measurement instruction from the network device through an RRC connection reestablishment message; and/or
receiving, by the terminal device, the CSI measurement instruction from the network device through an RRC connection resume message; and/or
receiving, by the terminal device, the CSI measurement instruction from the network device through a first RRC reconfiguration message after receiving an RRC connection reestablishment message, or through a first RRC reconfiguration message after receiving an RRC connection resume message; and/or
receiving, by the terminal device, the CSI measurement instruction from the network device through an SCG synchronous reconfiguration message, wherein the SCG synchronous reconfiguration message instructs the terminal device to add an SCG or instructs the terminal device to access to a target PSCell from a source PSCell; and/or
receiving, by the terminal device, the CSI measurement instruction from the network device through dedicated signaling, or the CSI measurement instruction triggered by expiry of a BWP inactivity timer, wherein the dedicated signaling or the expiry of the BWP inactivity timer triggers the terminal device to perform BWP switch from a source BWP to a target BWP, and the dedicated signaling is RRC signaling, Downlink Control Information (DCI) signaling, or Medium Access Control Control Element (MAC CE) signaling; and/or receiving, by the terminal device, the CSI measurement instruction from the network device through RRC signaling.

5. The method of claim 4, wherein the performing, by the terminal device, the CSI measurement according to the first measurement configuration on the specified BWP and within the specified time to obtain the CSI measurement results, comprises:

activating, by the terminal device, the first measurement configuration when reaching a preset position of a subframe where the CSI measurement according to the first measurement configuration is to be started, and performing the CSI measurement and reporting according to the first measurement configuration on the specified BWP; or performing, by the terminal device, the CSI measurement and reporting, according to the first measurement configuration, on the specified BWP, when receiving a dedicated signaling from the network device, wherein the dedicated signaling instructs the terminal device to activate the first measurement configuration, perform the CSI measurement and reporting according to the first measurement configuration, and the dedicated signaling is RRC signaling, DCI signaling, or MAC CE signaling.

6. The method of claim 4, further comprising:

stopping, by the terminal device, the CSI measurement and reporting according to the first measurement configuration, when reaching a preset position of a subframe where the CSI measurement according to the first measurement configuration is to be stopped, and deactivating the first measurement configuration; or stopping, by the terminal device, the CSI measurement and reporting according to the first measurement configuration, when receiving a dedicated signaling from the network device, wherein the dedicated signaling instructs the terminal device to deactivate the first measurement configuration, and stop the CSI measurement and reporting according to the first measurement configuration, and the dedicated signaling is RRC signaling, DCI signaling, or MAC CE signaling; or starting a timer upon starting the CSI measurement according to the first measurement configuration by the terminal device, deactivating the first measurement configuration, and stopping the CSI measurement and reporting according to the first measurement configuration, when the timer expires; or stopping, by the terminal device, the CSI measurement and reporting according to the first measurement configuration, and deactivating the first measurement configuration upon receiving downlink scheduling on the specified BWP.

7. The method of claim 4, wherein the first measurement configuration comprises at least one or more of:

configuration information of CSI measurement resources, wherein the configuration information of CSI measurement resources comprises at least one or more of: time domain configuration of CSI measurement resources; frequency domain configuration of CSI measurement resources; BWP identifier;

configuration information of CSI reporting, wherein the configuration information of CSI reporting comprises at least one or more of: configuration of frequency domain resources of CSI reporting; configuration of time domain resources of CSI reporting; BWP identifier;

effective duration indicating a duration for which the terminal device is able to perform the CSI measurement and reporting according to the first measurement configuration;

configuration information of a time domain position for activating the first measurement configuration;

configuration information of a time domain position for deactivating the first measurement configuration.

8. The method of claim 7, wherein a broadcast period, of a measurement reference signal, and included in the first measurement configuration, is less than a broadcast period, of a measurement reference signal, and included in the second measurement configuration; and/or a CSI reporting period included in the first measurement configuration is less than a CSI reporting period included in the second measurement configuration.

9. A method for measuring and reporting Channel State Information (CSI), comprising:

receiving, by a network device, CSI measurement results reported by a terminal device through a specified Bandwidth Part (BWP), wherein the CSI measurement results are obtained, by the terminal device performing a CSI measurement, according to a first measurement configuration, on the specified BWP, and within specified time; and scheduling, by the network device, the terminal device on the specified BWP according to the CSI measurement results;

wherein the network device receives CSI measurement results, reported by the terminal device, and obtained by performing a CSI measurement on the specified BWP according to a second measurement configuration, outside the specified time;

wherein the method further comprises:

sending, by the network device, a CSI measurement instruction to the terminal device, wherein the CSI measurement instruction carries identification information of the specified BWP, and/or the CSI measurement instruction carries the first measurement configuration, and/or the CSI measurement instruction carries indication information for instructing the terminal device to perform the CSI measurement and reporting according to the first measurement configuration within the specified time.

10. The method of claim 9, wherein the receiving, by the network device, the CSI measurement results reported by the terminal device through the specified BWP, comprises:

receiving, by the network device, the CSI measurement results reported by the terminal device through the specified BWP, when the terminal device performs a cell handover, or when the terminal device completes a cell handover; and/or receiving, by the network device, the CSI measurement results reported by the terminal device through the specified BWP, after the terminal device receives a Radio Resource Control (RRC) connection reestablishment message from the network device; and/or receiving, by the network device, the CSI measurement results reported by the terminal device through the specified BWP, after the terminal device receives an RRC connection resume message from the network device; and/or receiving, by the network device, the CSI measurement results reported by the terminal device through the specified BWP, after the terminal device receives a first RRC reconfiguration message after an RRC connection reestablishment message from the network device, or after the terminal device receives a first RRC reconfiguration message after an RRC connection resume message from the network device; and/or receiving, by the network device, the CSI measurement results reported by the terminal device through the specified BWP, when the terminal device performs Secondary Cell Group (SCG) addition or Primary SCG Cell (PSCell) change, or when the terminal device completes SCG addition or PSCell change; and/or receiving, by the network device, the CSI measurement results reported by the terminal device through a target BWP, when the terminal device switches an active BWP from a source BWP to the target BWP, wherein the network device sends a signaling triggering a BWP switch to the terminal device, to trigger the terminal device to switch the active BWP from the source BWP to the target BWP, or the network device configures a BWP inactivity timer for the terminal device, to trigger the terminal device to switch the active BWP from the source BWP to the target BWP, when the BWP inactivity timer expires; or the network device sends a signaling triggering a BWP switch to the terminal device, to trigger the terminal device to switch the active BWP from the source BWP to the target BWP.

11. The method of claim 9, wherein
the specified BWP is a first active downlink BWP specified by a Primary Cell (PCell), or an initial downlink BWP specified by the PCell; and/or
the specified BWP is a first active downlink BWP specified by a Primary SCG Cell (PSCell), or an initial downlink BWP specified by the PSCell.

12. The method of claim 9,
wherein the sending, by the network device, the CSI measurement instruction to the terminal device, comprises:
sending, by the network device, the CSI measurement instruction to the terminal device through handover signaling, wherein the handover signaling instructs the terminal device to switch from a source primary cell to a target primary cell; and/or
sending, by the network device, the CSI measurement instruction to the terminal device through an RRC connection reestablishment message; and/or
sending, by the network device, the CSI measurement instruction to the terminal device through an RRC connection resume message; and/or
sending, by the network device, the CSI measurement instruction to the terminal device through a first RRC reconfiguration message after sending an RRC connection reestablishment message, or through a first RRC reconfiguration message after sending an RRC connection resume message; and/or
sending, by the network device, the CSI measurement instruction to the terminal device through an SCG synchronous reconfiguration message, wherein the SCG synchronous reconfiguration message instructs the terminal device to add an SCG or instructs the terminal device to switch from a source PSCell to a target PSCell; and/or
sending, by the network device, the CSI measurement instruction to the terminal device through dedicated signaling, or configuring, by the network device, a BWP inactivity timer for the terminal device to trigger the CSI measurement instruction of the terminal device when the BWP inactivity timer expires, wherein the dedicated signaling or the expiry of the BWP inactivity timer triggers the terminal device to switch an active BWP from a source BWP to a target BWP, and the dedicated signaling is RRC signaling, Downlink Control Information (DCI) signaling, or Medium Access Control Control Element (MAC CE) signaling; and/or
sending, by the network device, the CSI measurement instruction to the terminal device through RRC signaling.

13. The method of claim 12, further comprising:
sending, by the network device, a dedicated signaling to the terminal device so that the terminal device performs the CSI measurement and reporting according to the first measurement configuration on the specified BWP, wherein
the dedicated signaling instructs the terminal device to activate the first measurement configuration, and perform the CSI measurement and reporting according to the first measurement configuration, and the dedicated signaling is RRC signaling, DCI signaling, or MAC CE signaling.

14. The method of claim 12, further comprising:
sending, by the network device, a dedicated signaling to the terminal device so that the terminal device stops the CSI measurement and reporting according to the first measurement configuration, wherein
the dedicated signaling instructs the terminal device to deactivate the first measurement configuration, and stop the CSI measurement and reporting according to the first measurement configuration, and the dedicated signaling is RRC signaling, DCI signaling, or MAC CE signaling.

15. The method of claim 12, wherein the first measurement configuration comprises at least one or more of:
configuration information of CSI measurement resources, wherein the configuration information of CSI measurement resources comprises at least one or more of: time domain configuration of CSI measurement resources; frequency domain configuration of CSI measurement resources; BWP identifier;
configuration information of CSI reporting, wherein the configuration information of CSI reporting comprises at least one or more of: configuration of frequency domain resources of CSI reporting; configuration of time domain resources of CSI reporting; BWP identifier;
effective duration indicating a duration for which the terminal device is able to perform the CSI measurement and reporting according to the first measurement configuration;
configuration information of a time domain position for activating the first measurement configuration;
configuration information of a time domain position for deactivating the first measurement configuration.

16. The method of claim 15, wherein
a broadcast period, of a measurement reference signal, and included in the first measurement configuration, is less than a broadcast period, of a measurement reference signal, and included in the second measurement configuration; and/or a CSI reporting period included in the first measurement configuration is less than a CSI reporting period included in the second measurement configuration.

17. A terminal device, comprising:

a memory configured to store instructions;

a processor configured to read the instructions stored in the memory to perform the process of:

performing a CSI measurement, according to a first measurement configuration, on a specified Bandwidth Part (BWP), and within specified time, to obtain CSI measurement results;

a transmitter configured to report the CSI measurement results to a network device on the specified BWP under control of the processor;

wherein the terminal device performs a CSI measurement on the specified BWP according to a second measurement configuration outside the specified time;

wherein the terminal device further comprises:

a receiver configured to receive a CSI measurement instruction from the network device, wherein the CSI measurement instruction carries identification information of the specified BWP, and/or the CSI measurement instruction carries the first measurement configuration, and/or the CSI measurement instruction carries indication information for instructing the terminal device to perform the CSI measurement and reporting according to the first measurement configuration within the specified time.

18. The terminal device of claim 17, wherein the processor is configured to:

perform the CSI measurement, according to the first measurement configuration, on the specified BWP, and within the specified time to obtain the CSI measurement results, when the terminal device performs a cell handover, or when the terminal device completes a cell handover; and/or perform the CSI measurement, according to the first measurement configuration, on the specified BWP, and within the specified time to obtain the CSI measurement results, when receiving a Radio Resource Control (RRC) connection reestablishment message from the network device; and/or perform the CSI measurement, according to the first measurement configuration, on the specified BWP, and within the specified time to obtain the CSI measurement results, when receiving an RRC connection resume message from the network device; and/or perform the CSI measurement, according to the first measurement configuration, on the specified BWP, and within the specified time to obtain the CSI measurement results, when receiving a first RRC reconfiguration message after an RRC connection reestablishment message from the network device, or when receiving a first RRC reconfiguration message after an RRC connection resume message from the network device; and/or perform the CSI measurement, according to the first measurement configuration, on the specified BWP, and within the specified time to obtain the CSI measurement results, when the terminal device performs Secondary Cell Group (SCG) addition or Primary SCG Cell (PSCell) change, or when the terminal device completes SCG addition or PSCell change; and/or perform the CSI measurement, according to the first measurement configuration, on a target BWP, and within the specified time to obtain the CSI measurement results, when switching an active BWP from a source BWP to the target BWP, wherein the terminal device switches the active BWP from the source BWP to the target BWP, when receiving a signaling triggering a BWP switch from the network device, or when a BWP inactivity timer expires; or the terminal device switches the active BWP from the source BWP to the target BWP, when receiving a signaling triggering a BWP switch from the network device.

19. A network device, comprising:

a memory configured to store instructions;

a processor configured to read the instructions stored in the memory to perform the method of claim 9 via a receiver.

20. The terminal device of claim 17, wherein the specified BWP is a first active downlink BWP specified by a Primary Cell (PCell), or an initial downlink BWP specified by the PCell; and/or the specified BWP is a first active downlink BWP specified by a Primary SCG Cell PSCell), or an initial downlink BWP specified by the PSCell.

21. The terminal device of claim 17, wherein the receiver is further configured to:

receive the CSI measurement instruction from the network device through handover signaling, wherein the handover signaling instructs the terminal device to switch from a source primary cell to a target primary cell; and/or receive the CSI measurement instruction from the network device through an RRC connection reestablishment message; and/or receive the CSI measurement instruction from the network device through an RRC connection resume message; and/or receive the CSI measurement instruction from the network device through a first RRC reconfiguration message after receiving an RRC connection reestablishment message, or through a first RRC reconfiguration message after receiving an RRC connection resume message; and/or receive the CSI measurement instruction from the network device through an SCG synchronous reconfiguration message, wherein the SCG synchronous reconfiguration message instructs the terminal device to add an SCG or instructs the terminal device to access to a target PSCell from a source PSCell; and/or receive the CSI measurement instruction from the network device through dedicated signaling, or the CSI measurement instruction triggered by expiry of a BWP inactivity timer, wherein the dedicated signaling or the expiry of the BWP inactivity timer triggers the terminal device to perform BWP switch from a source BWP to a target BWP, and the dedicated signaling is RRC signaling, Downlink Control Information (DCI) signaling, or Medium Access Control Control Element (MAC CE) signaling; and/or receive the CSI measurement instruction from the network device through RRC signaling.

22. The terminal device of claim 21, wherein the processor is configured to:

activate the first measurement configuration when reaching a preset position of a subframe where the CSI measurement according to the first measurement configuration is to be started, and perform the CSI measurement and reporting according to the first measurement configuration on the specified BWP; or perform the CSI measurement and reporting, according to the first measurement configuration, on the specified BWP, when receiving a dedicated signaling from the network device, wherein the dedicated signaling instructs the terminal device to activate the first measurement configuration, perform the CSI measurement and reporting according to the first measurement configuration, and the dedicated signaling is RRC signaling, DCI signaling, or MAC CE signaling.

23. The terminal device of claim 21, wherein the processor is further configured to:

stop the CSI measurement and reporting according to the first measurement configuration, when reaching a preset position of a subframe where the CSI measurement according to the first measurement configuration is to be stopped, and deactivate the first measurement configuration; or stop the CSI measurement and reporting according to the first measurement configuration, when receiving a dedicated signaling from the network device, wherein the dedicated signaling instructs the terminal device to deactivate the first measurement configuration, and stop the CSI measurement and reporting according to the first measurement configuration, and the dedicated signaling is RRC signaling, DCI signaling, or MAC CE signaling; or start a timer upon starting the CSI measurement according to the first measurement configuration by the terminal device, deactivate the first measurement configuration, and stop the CSI measurement and reporting according to the first measurement configuration, when the timer expires; or stop the CSI measurement and reporting according to the first measurement configuration, and deactivate the first measurement configuration upon receiving downlink scheduling on the specified BWP.

24. The terminal device of claim 21, wherein the first measurement configuration comprises at least one or more of:

configuration information of CSI measurement resources, wherein the configuration information of CSI measurement resources comprises at least one or more of: time domain configuration of CSI measurement resources; frequency domain configuration of CSI measurement resources; BWP identifier;

configuration information of CSI reporting, wherein the configuration information of CSI reporting comprises at least one or more of: configuration of frequency domain resources of CSI reporting; configuration of time domain resources of CSI reporting; BWP identifier;

effective duration indicating a duration for which the terminal device is able to perform the CSI measurement and reporting according to the first measurement configuration;

configuration information of a time domain position for activating the first measurement configuration;

configuration information of a time domain position for deactivating the first measurement configuration.

25. The terminal device of claim 24, wherein a broadcast period, of a measurement reference signal, and included in the first measurement configuration, is less than a broadcast period, of a measurement reference signal, and included in the second measurement configuration; and/or a CSI reporting period included in the first measurement configuration is less than a CSI reporting period included in the second measurement configuration.

* * * * *